(12) United States Patent
Van Brandenburg et al.

(10) Patent No.: US 11,936,838 B2
(45) Date of Patent: Mar. 19, 2024

(54) METHODS AND DEVICES FOR RENDERING A VIDEO ON A DISPLAY

(71) Applicant: TILEDMEDIA B.V., Rotterdam (NL)

(72) Inventors: Ray Van Brandenburg, Rotterdam (NL); Xavier Albert Jean-Pierre Corbillon, Rotterdam (NL); Arjen Timotheus Veenhuizen, Rotterdam (NL)

(73) Assignee: TILEDMEDIA B.V. (NL)

( * ) Notice: Subject to any disclaimer, the term of this patent is extended or adjusted under 35 U.S.C. 154(b) by 50 days.

(21) Appl. No.: 17/612,313

(22) PCT Filed: Jul. 3, 2020

(86) PCT No.: PCT/EP2020/068780
§ 371 (c)(1),
(2) Date: Nov. 18, 2021

(87) PCT Pub. No.: WO2021/004918
PCT Pub. Date: Jan. 14, 2021

(65) Prior Publication Data
US 2022/0224871 A1    Jul. 14, 2022

(30) Foreign Application Priority Data

Jul. 5, 2019  (EP) .................................. 19020418

(51) Int. Cl.
*H04N 13/111*  (2018.01)
*H04N 19/172*  (2014.01)
(Continued)

(52) U.S. Cl.
CPC ......... *H04N 13/111* (2018.05); *H04N 19/172* (2014.11); *H04N 21/234363* (2013.01); *H04N 21/23439* (2013.01); *H04N 21/47202* (2013.01)

(58) Field of Classification Search
CPC .............. H04N 13/111; H04N 19/172; H04N 21/234363; H04N 21/23439;
(Continued)

(56) References Cited

U.S. PATENT DOCUMENTS

2019/0174150 A1*  6/2019  D'Acunto ........ H04N 21/43072

FOREIGN PATENT DOCUMENTS

CN      107454468 A      12/2017
CN      109691103 A       4/2019
(Continued)

OTHER PUBLICATIONS

Extended European Search Report for corresponding European application No. 19020418.0; dated Jan. 21, 2020 (9 pages).
(Continued)

*Primary Examiner* — Oschta I Montoya
(74) *Attorney, Agent, or Firm* — Mendelsohn Dunleavy, P.C.

(57) ABSTRACT

A method is described for rendering a spatial part of an immersive video on a display of a client device comprising a tile frame retrieval device, a decoder device and a renderer device, wherein the immersive video comprises video frames, each video frame being spatially divided in tile frames, and the immersive video comprises tile streams, each tile stream representing a spatial part of the immersive video and each tile stream comprising a plurality of said tile frames, and wherein the client has stored tile stream mapping information, that indicates for each tile stream a respective position on a surface of a two-dimensional or three-dimensional model, such as a sphere or cube, the method comprising based on said tile stream mapping information and a viewport, the tile frame retrieval device determining a plurality of tile streams, and requesting encoded video data
(Continued)

from a server, the encoded video data comprising, for each determined tile stream, an encoded tile frame that comprises encoded data representative of a tile frame comprised in the tile stream; the tile frame retrieval device receiving the encoded tile frames and forming an encoded video frame comprising the received encoded tile frames, each encoded tile frame having a position in the encoded video frame, and the tile frame retrieval device generating tile frame arrangement information indicating the position of each encoded tile frame within the encoded video frame; the decoder device decoding the encoded video frame to obtain a decoded video frame comprising the tile frames at respective positions within the decoded video frame; based on the tile frame arrangement information and based on the tile stream mapping information, the renderer device mapping the decoded video frame onto one or more surfaces of the two-dimensional or three-dimensional model so that each tile frame is mapped onto the position of the one or more surfaces of the model as indicated; based on the mapped decoded video frame, the renderer device rendering at least part of the decoded video frame on the display of the client device.

16 Claims, 15 Drawing Sheets

(51) Int. Cl.
*H04N 21/2343* (2011.01)
*H04N 21/472* (2011.01)

(58) Field of Classification Search
CPC ......... H04N 21/47202; H04N 21/2343; H04N 21/8456; H04N 21/21805
See application file for complete search history.

(56) References Cited

FOREIGN PATENT DOCUMENTS

| WO | 2015197818 A1 | 12/2015 |
| WO | 2019008174 A1 | 1/2019 |
| WO | 2019048426 A1 | 3/2019 |

OTHER PUBLICATIONS

International Search Report and Written Opinion for corresponding International application No. PCT/EP2020/068780; dated Oct. 30, 2020 (14 pages).
ITU-T, "H.265—High efficiency video coding." International Standard ISO/IEC 23008-2 (Feb. 2018): 1-672.
International Organisation for Standardisation, "WD5 of ISO/IEC 23090-2 OMAF 2nd edition." (May 2019): 237 pages.
Communication pursuant to Article 94(3) EPC for corresponding European application No. 19020418.0; dated Jun. 22, 2013 (7 pages).
First Examination Report for corrseponding Chinese application No. 202080043917.3; dated Aug. 29, 2023 (24 pages) Machine Translation.

* cited by examiner

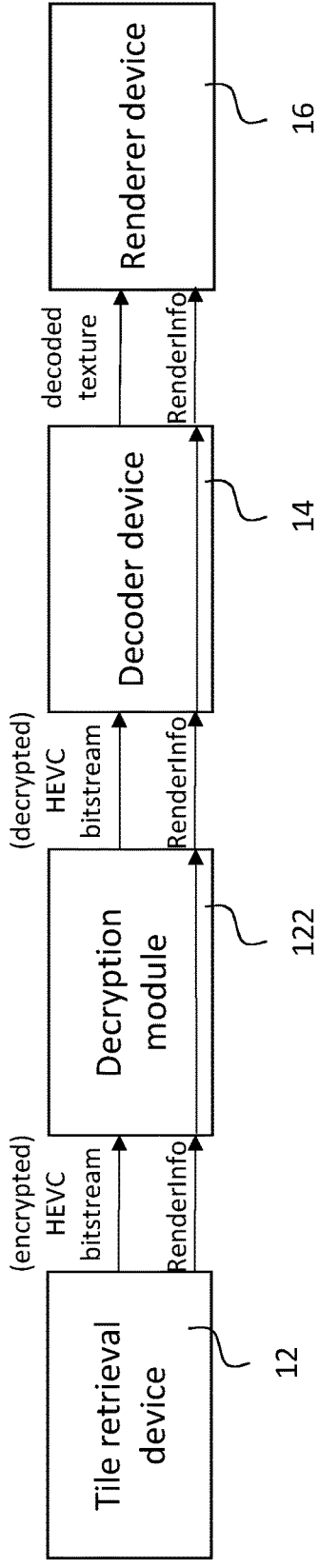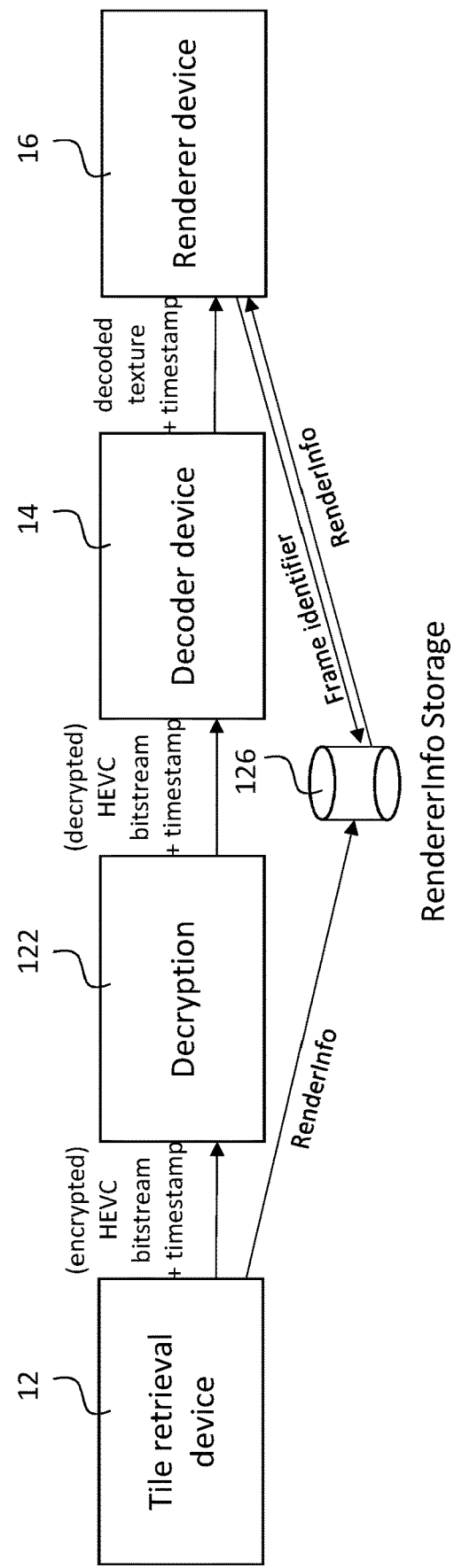
Fig. 13A
Fig. 13B

```
type RendererFrame {
    (Hash)
    RenderTimestamp                          ⎬ 128

TextureWidth                             ⎬ 130
    TextureHeight

MeshType        // Cubemap, ERP, Planar  ⎬ 132
    MeshLeftPadding                          ⎫
    MeshRightPadding                         ⎬ 134
    MeshTopPadding                           ⎪
    MeshBottomPadding                        ⎭

LeftEyeTiles  TileShuffleInfo[]          ⎬ 136
    RightEyeTiles TileShuffleInfo[]
}
```
⎵ 127

```
type TileShuffleInfo {                       ⎬ 138
    Layer

SourceX                                  ⎬ 140
    SourceY
    SourceWidth                              ⎬ 142
    SourceHeight InterpolationPaddingLeft                 ⎫
    InterpolationPaddingRight                ⎬ 144
    InterpolationPaddingTop                  ⎪
    InterpolationPaddingDown                 ⎭
}
```
⎵ 129

Fig. 14

```
aligned(8) class TileMeshBox() {
    unsigned int(8) num_regions;
    unsigned int(16) packed_picture_width;
    unsigned int(16) packed_picture_height;
bit(7) reserved = 0;
unsigned int(1) guard_band_flag;
unsigned int(4) packed_map_type;
unsigned int(4) mesh_type;
    for (i = 0; i < num_regions; i++) {
        bit(7) reserved = 0;
        unsigned int(1) eye[i];
        if (packed_map_type[i] == 0) {
            if (mesh_type[i] == 0) {
                SphereRegionStruct (1, 0);
            }
            if (mesh_type[i] == 1) {
                3DParallelogram ();
            }
            RectPackedRegion ();
            if (guard_band_flag[i])
                GuardBand(i);
        }
    }
}
```

Fig. 15

METHODS AND DEVICES FOR RENDERING A VIDEO ON A DISPLAY

FIELD OF THE INVENTION

This disclosure relates to a method for rendering a spatial part of an immersive video on a display of a client device, and to a computer program

BACKGROUND

WO2019048426A1 and WO2015197818A1 describe methods for tiled streaming of video data. In tiled streaming, a video is split up into tile streams and each video frame is split up into individual spatial element frames, also referred to as tile frames. A tile stream may be regarded as a separate video that contains only a particular spatial region of the video. Each tile stream may be understood to consist of a plurality of temporally separated spatial element frames, one for each video frame out of a plurality of video frames. Since these spatial element frames may be rectangular, they are referred to herein as "tile frames". It should be understood that a "tile frame" as used herein may have any shape, such as a triangular shape.

With immersive video, such as 360 degrees video or 180 degrees video, a client device typically consumes only a part of the entire video. Only the part of the video that is present in the so-called viewport is rendered on a display by the client device. The viewport can typically be controlled by a user, for example by a user changing the orientation of his head when wearing a head-mounted display as client device.

An advantage of tiled streaming is that only the tile frames that are required to render on the display the appropriate part of the video, i.e. the part of the video that is currently in the viewport, can be sent to the client device. This greatly reduces the consumed bandwidth in comparison with streaming methods wherein the entire immersive video is transmitted to the client, including the spatial parts of the video that are not going to be rendered on the display of the client device.

Each tile stream is preferably encoded independently from other tile streams. However, within a tile stream, some tile frames may be encoded with reference to other tile frames within that tile stream which results in so-called inter-coded tile frames, and other tile frames may be encoded without reference to other tile frames within the tile stream which results in so-called intra-coded tiles.

In tiled streaming, each encoded video frame that is fed to the decoder thus comprises selected encoded tile frames. Typically, how these tile frames are arranged in the encoded video frame varies. The tile frame arrangements may vary per encoded video frame, and thus also per decoded video frame as output by the decoder. One simple reason for the varying tile frame arrangements is that each frame can comprise a different set of tile frames. The rendering step can ensure that the tile frames are reshuffled to their intended position in the rendered viewport.

A problem may arise if tiled streaming is consumed by a client device that comprises a so-called protected media path. Such a protected media path is typically implemented to enforce digital rights management (DRM) protections on content. In such case, the client device receives encrypted encoded video data from a server. The client device comprises a decryption module that is configured to decrypt the encrypted encoded video data, for example by retrieving a decryption key and using the decryption key for decryption. Subsequently, the decrypted encoded video data may be provided to a decoder device for decoding and then to a renderer device for rendering the content on a display. A protected media path prevents any access to the decrypted video data (encoded or decoded), so that the decrypted video data cannot be illegally copied for example.

In more traditional immersive, viewport-adaptive video streaming methods, a content preparation device typically has stored raw video data and generates a bitstream based on the raw video data in dependence of a detected viewport at the client device. The bitstream may then be encoded and encrypted at the content preparation device. Such methods allow for the content preparation device to package into the bitstream any information that is required for rendering. Thus, this render information is already present in the encrypted encoded video data that the client device receives. The render information travels along in the bitstream through the protected media path and can thus be provided to the renderer device without accessing decrypted encoded or decrypted decoded video data.

However, when the client device select the tile frames that are required for rendering the correct viewport, and requests them, the tile frames already have been encrypted and encoded. Therefore, the render information is not present yet in the encrypted data. The fact that the tile frames have already been encrypted and decoded greatly reduces the latency. However, as said, the tile frame arrangement of encoded and decoded video frames may vary each frame and the tile frame arrangement in which a particular tile frame will end up, is not known at the moment of encryption. Further, because of the protected media path, it is not possible to access the decrypted video data at the client device in order to add the required render information to the decrypted video data. Therefore, low latency tiled streaming cannot typically be used in client devices that comprise a protected media path.

US2019/174150A1 discloses a method for processing an onmidirectional video by a client device, said onmidirectional video being associated with a 3D coordinate system for determining a spatial position of video data of said onmidirectional video on a curved surface, preferably a sphere, said method comprising: receiving a manifest file, the manifest file comprising a plurality of tile stream identifiers for identifying a plurality of tile streams, the tile streams comprising video frames having image views, whereby the image views of video frames of different tile streams cover different regions of a 2D projection of the onmidirectional video, a region defining a tile; selecting on the basis of spatial relation information in the manifest file and on the basis of a viewpoint of a user of the client device a first tile streams associated with a first resolution and a first tile position and a second tile stream associated with a second resolution and a second tile position, the second resolution being lower than the first resolution, wherein the spatial relation information defines for each tile a tile position and wherein the viewpoint defines a viewing direction of the user, tile position and the viewpoint being defined on the basis of coordinates of the 3D coordinate system.

WO2019/008174A1 discloses a concept of applying en/decryption to tile-based video streaming. In accordance with a first variant, one or more subsets of bitstreams, each subset relating to a corresponding portion of the video picture area and collecting bitstreams of different qualities, for instance, is subject to encryption so that the compiled bitstream resulting from picking-out from each of these subsets one bitstream by way of an extractor, has for a current picture frame, one encrypted picture portion of the one bitstream out of each encrypted subset. In accordance with this first aspect, the encryption takes place by block-wise encryption and the decryption by block-wise decryption, both by use of sequential variation of a plain text mask and/or block-decryption key, and in particular, the sequential variation is subject to reinitialization for each picture portion which forms a respective sub-picture portion in the compiled bitstream. At the client-side, in turn, i.e. at the download side, borders of a coding payload section of encrypted sub-picture portions are detected on the basis of one of the following alternatives: by parsing the coding payload section of such an encrypted sub-picture portion up to a currently decrypted position and/or by deriving a length of the coding payload section of the respective sub-picture portion from a header within the respective sub-picture portion, and/or using a bitstream length or pointer indication signaled within the bitstream from which the picture portion is extracted which the respective sub-picture portion belongs to. This disclosure aims to provide a method for rendering a spatial part of an immersive video, wherein varying tile frame arrangements in subsequent video frames are efficiently taken into account.

SUMMARY

Therefore a method is provided for rendering a spatial part of an immersive video on a display of a client device. The client device comprises a tile frame retrieval device, a decoder device and a renderer device. The immersive video comprises video frames and each video frame is spatially divided in tile frames. The immersive video comprises tile streams, each tile stream representing a spatial part of the immersive video and each tile stream comprising a plurality of said tile frames. The client has stored tile stream mapping information that indicates for each tile stream a respective position on a surface of a two-dimensional or three-dimensional model, such as a sphere or cube. The method comprises, based on said tile stream mapping information and a viewport, the tile frame retrieval device determining a plurality of tile streams, and requesting encoded video data from a server. The encoded video data comprises, for each determined tile stream, an encoded tile frame that comprises encoded data representative of a tile frame comprised in the tile stream. For example, the encoded video data comprises for a first respectively second determined tile stream, a first respectively second encoded tile frame that comprises encoded data representative of a first respectively second tile frame. Herein, the first respectively second tile frame is comprised in the first respectively second tile stream.

The method further comprises the tile frame retrieval device receiving the encoded tile frames and forming an encoded video frame. The encoded video frame comprises the received encoded tile frames. Further, each encoded tile frame has a position in the encoded video frame. The method also comprises the tile frame retrieval device generating tile frame arrangement information. This information indicates the position of each encoded tile frame within the encoded video frame.

The method further comprises the decoder device decoding the encoded video frame to obtain a decoded video frame. The decoded video frame comprises the tile frames at respective positions within the decoded video frame. The decoder device may output the decoded video frame. Alternatively, the decoder device may output an intermediate video frame, which can subsequently be processed and/or modified to obtain the decoded video frame referred to above.

The method further comprises, based on the tile frame arrangement information and based on the tile stream mapping information, the renderer device mapping the decoded video frame onto one or more surfaces of the two-dimensional or three-dimensional model so that each tile frame is mapped onto the position of the one or more surfaces of the model.

The method further comprises, based on the mapped decoded video frame, the renderer device rendering at least part of the decoded video frame on the display of the client device.

Another aspect of this disclosure relates to a method for rendering a spatial part of an immersive video on a display of a client device, the client device comprising a tile frame retrieval device, a decoder device and a renderer device, the immersive video comprising a sequence of video frames, each video frame being spatially divided in tile frames, the tile frames in the sequence of video frames defining tile streams, each tile stream representing a spatial part of the immersive video;

the client being adapted to store tile stream mapping information, indicating for each tile stream a respective position on a surface of a two-dimensional or three-dimensional model, such as an equirectangular or a cubic model, the method comprising:

the tile frame retrieval device determining a plurality of tile streams based on the tile stream mapping information and first viewport information;

the tile frame retrieval device requesting encoded video data associated with the plurality of tile streams from a server, optionally identified in a manifest file, the encoded video data comprising, for each of the plurality of tile streams, an encoded tile frame comprising encoded video data representative of a tile frame;

the tile frame retrieval device receiving the encoded tile frames and forming an encoded video frame comprising the received encoded tile frames, preferably a spatial arrangement of encoded tile frames, each encoded tile frame having a position in the encoded video frame;

the tile frame retrieval device generating tile frame arrangement information indicating the position of each encoded tile frame within the encoded video frame;

the decoder device decoding the encoded video frame into a decoded video frame comprising the tile frames at respective positions within the decoded video frame;

the renderer device generating a mapped decoded video frame, the generating including mapping tile frames of the decoded video frame onto one or more surfaces of the two-dimensional or three-dimensional model based on the tile frame arrangement information and based on the tile stream mapping information (optionally defining a relation between a tile frame and one of the or more faces of the 2D or 3D model); and, the renderer device using second viewport information to render at least part of the mapped decoded video frame on the display of the client device.

Advantageously, the methods use the fact that the client retrieval device forms the encoded video frame and can therefore generate the tile arrangement information, for example by simply keeping track as to which encoded tile frame it places at which position in the encoded video frame. Typically, the decoder does not alter the tile arrangement, at least not in an unpredictable manner, so that if the tile arrangement in the encoded video frame is known, then the tile arrangement in the associated decoded video frame can also be determined. A client device may be any device that is configured to connect to a server system, such as a head-mounted display, a telephone, a television, a tablet computer et cetera. The client device optionally comprises the display. In an embodiment, the client device is an edge server without a display as explained herein.

Each tile frame may be understood to comprise picture data, such as samples and/or pixels, representing a picture. The tile frames within a given tile stream may be understood to be temporally separated in the sense that the respective pictures of the tile frames have different timestamps.

A viewport may be understood to be the spatial area of the immersive video that is rendered on the display of the client device. Preferably, the client device comprises a viewport detection device that is configured to detect a current or expected viewport. An example of such a viewport detection device would be one or more orientation sensors on a head-mounted display that are configured to detect the orientation of the head-mounted display and to determine the viewport information for this orientation. Viewport information may indicate the position of the viewport on one or more surfaces of the model. The first viewport information may be measured at a first time instance before the determination as to which tile frames are to be retrieved and the second viewport information may be measured at a second time instance after the tile frames have been received, optionally after the tile frames have been decoded.

The tile stream mapping information may comprise tile stream identifiers and may be understood to enable the tile frame retrieval device to retrieve the appropriate tile frames based on a current or expected viewport.

A position is for example defined by a slice header segment address as defined by the HEVC standard document ISO/IEC 23008-2. In this case, when two encoded tile frames in two respective encoded video frames have the same position, it may be understood as that the two encoded tile frames are associated with the same slice header segment address.

In this disclosure, an encoded tile frame can be said to have a position in an encoded video frame and a decoded tile frame can be said to have a position in a decoded video frame. A position of an encoded tile frame in an encoded video frame may be referred to as an encoded video frame position and a position of a decoded tile frame in a decoded video frame may be referred to as a decoded video frame position.

A model may comprise a plurality of surfaces that meet in vertices. To illustrate, when the model is a three-dimensional cube, the model comprises eight vertices, namely the eight corners of the cube. The method for rendering the spatial part may comprise a step of, for each vertex of a plurality of, e.g. all, vertices of the model, determining an associated position in a decoded video frame. This step may be understood as mapping the decoded video frame onto one or more surfaces of the model. If for every vertex of a surface of the model, the associated "vertex" position in the decoded video frame has been determined, then the associated position, and thus the associated sample, in the decoded video frame can be determined for every position on this surface on the basis of an interpolation between vertex positions in the decoded video frame. Typically, the three-dimensional model consists of two-dimensional triangles. Mapping a decoded video frame onto the three-dimensional model may comprise determining for each vertex of such triangle, the associated position in the decoded video frame. Thus, the mapping does not necessarily involve mapping all position in the decoded video frame onto one or more surfaces of the model.

The encoded tile frames are preferably pre-stored on the server. If, based on a viewport, a selection of tile streams would be made at the server and the selected tiles would still need to be encoded at the server, then the latency would increase significantly.

It should be appreciated that the method comprises the steps for rendering a spatial part of a single video frame, however, for rendering the spatial part of a plurality of video frames, the method can simply be performed repeatedly.

Preferably, the tile streams have been separately encoded so that each tile frame in one tile stream can be decoded without reference to a tile frame from another tile stream.

The encoded video frame may be in the form of an encoded bitstream and the decoded video frame in the form of a decoded bitstream.

The tile stream mapping information may be part of a manifest file, which comprises location information (URLs) of one or more servers on which the tile streams are stored.

In an embodiment, the renderer device is configured to perform a predetermined mapping when mapping a decoded video frame onto one or more surfaces of the model. Such embodiment comprises the decoder device decoding the encoded video frame and outputting an intermediate decoded video frame. The intermediate decoded video frame comprises the tile frames at respective positions within the intermediate decoded video frame. Such embodiment also comprises, based on the tile stream mapping information and on the tile frame arrangement information, determining, e.g. by the renderer device, the decoded video frame comprising re-arranging tile frames such that at least one tile frame has a different position in the intermediate decoded video frame than in the decoded video frame. Such embodiment also comprises the renderer device performing the predetermined mapping.

This embodiment advantageously allows to use renderer devices that use a predetermined mapping. The predetermined mapping may be hard-coded so that the renderer cannot map in any other manner.

The step of determining the decoded video frame optionally comprises scaling up one or more of the tile frames. This would for example allow to use high quality tile frames and low quality tile frames, as will be further explained below.

In an embodiment, the renderer device is configured to determine a mapping for a decoded video frame in dependence of the associated tile arrangement information. Such embodiment comprises the decoder device decoding the encoded video frame and outputting the decoded video frame and the renderer device mapping the decoded video frame in accordance with the determined mapping onto one or more surfaces of the model.

This method is advantageous in that the decoded video frame as output by the decoder can directly be mapped onto the model. In the previous embodiment, the decoded video frame may be understood to be a copy version of the intermediate decoded video frame.

Further, this embodiment obviates the need to scale up one or more tile frames, which is a very computing intensive process because it involves the calculation of new samples to fill the scaled up versions of the tile frames.

In an embodiment, generating a mapped decoded video frame comprises:

before mapping the tile streams, re-arranging one or more tile frames in the decoded video frame based on the based on the tile frame arrangement information and based on the tile stream mapping information.

In an embodiment, the method comprises the tile frame retrieval device determining render information based on the tile stream mapping information and based on the tile frame arrangement information. Such embodiment also comprises
the tile frame retrieval device providing the render information to the renderer device, and
the renderer device performing the mapping based on the render information.

This embodiment advantageously allows to reduce the computational load for the renderer device. The render information may indicate for every vertex of the model the associated position, and thus the associated sample, in the decoded video frame. Therefore, the render information may be understood to already comprise the mapping. In this case, the renderer device storing this information, for example in a buffer, may be understood as the renderer device performing the mapping.

In an embodiment, the encoded video frame comprises a frame identifier, such as a time stamp. In such embodiment, the tile arrangement information and/or render information comprises said frame identifier. Such embodiment comprises the renderer device determining that the frame identifier of the decoded video frame matches the frame identifier of the tile arrangement information and/or render information, and based on this determination, the renderer device using the tile arrangement information and/or render information for mapping the decoded video frame onto one or more surfaces of the two-dimensional or three-dimensional model. This embodiment allows to provide the tile arrangement information and/or the render information to the renderer device separately from the decoded video frame.

The retrieved encoded tile frames may be encrypted. In this case, preferably, the client device comprises a decryption module that is configured to retrieve a key for decrypting the encrypted encoded tile frames. As a result, the encoded video frame formed by the tile frame retrieval device is encrypted. The tile frame retrieval device may be able to still form the encrypted encoded video frame, because part of the received encoded tiles is not encrypted, e.g. part of a header segment of the encoded tile frames. This may allow the tile retrieval device to (re)-write an address, e.g. in an NAL unit header, and herewith control the position of the encrypted encoded tile frame in the encrypted encoded video frame. The tile frame retrieval device may provide the encrypted encoded video frame to the decryption module, that subsequently retrieves a key and decrypts the encrypted encoded video frame. Then, the decryption module may provide the encoded video frame to the decoder.

In an embodiment, the client device comprises a protected media path that is configured to prevent access to decrypted video data, e.g. to prevent addition of the tile frame arrangement information and/or the render information to encoded video frames and/or configured to prevent addition of the tile frame arrangement information and/or the render information to decoded video frames. Such embodiment comprises the tile frame retrieval device providing the render information and/or the tile stream mapping information and/or the tile frame arrangement information to the renderer device outside of the protected media path. This embodiment enables a client device to implement tiled streaming even if a protected media path is present in the client device.

Providing the render information and/or the tile stream mapping information and/or the tile frame arrangement information to the renderer device outside of the protected media path may comprise providing the render information and/or tile arrangement information separately from the decoded video frame to the renderer device.

In an embodiment, the determined plurality of tile streams comprises a first tile stream and a second tile stream. In such embodiment the mapping information indicates for the first tile stream a first position on a surface of the model and indicates for the second tile stream a second position on a surface of the model. The encoded video data comprises, for the first tile stream, an encoded first tile frame that comprises encoded data representative of a first tile frame comprised in the first tile stream and comprises, for the second tile stream, an encoded second tile frame that comprises encoded data representative of a second tile frame comprised in the second tile stream. Such embodiment comprises the tile frame retrieval device receiving the encoded first tile frame and encoded second tile frame and forming the encoded video frame comprising the received encoded tile frames, the first encoded tile frame having a first position in the encoded video frame and the second encoded tile frame having a second position in the encoded video frame. Such embodiment comprises the decoder device decoding the encoded video frame to obtain a decoded video frame comprising the first tile frame at a first position within the decoded video frame and the second tile frame at a second position within the decoded video frame. Such embodiment comprises based on the tile frame arrangement information and based on the tile stream mapping information, the renderer device mapping the decoded video frame onto one or more surfaces of the two-dimensional or three-dimensional model so that the first tile frame is mapped onto the first position on a surface of the model and so that the second tile frame is mapped onto the second position on a surface of the model.

A position of an encoded spatial element frame within an encoded video frame may be understood to be defined by an address.

In an embodiment, the renderer device is configured to receive a decoded video frame and perform a predetermined mapping comprising mapping respective samples at respective positions in the received decoded video frame to respective predetermined positions on one or more surfaces of the two-dimensional or three-dimensional model. The predetermined mapping comprises mapping samples at the first position in the received decoded video frame onto said first position on a surface of the model. Such embodiment comprises the decoder device decoding the encoded video frame and outputting an intermediate decoded video frame, the intermediate decoded video frame comprising the first tile frame at a position that is different from the first position. Such embodiment comprises determining, e.g. by the renderer device, said decoded video frame based on the intermediate decoded video frame and based on the tile frame arrangement information and based on the predetermined mapping, such that the decoded video frame comprises the first tile frame at the first position. Such embodiment comprises the renderer device, in accordance with the predetermined mapping, mapping the decoded video frame, herewith mapping the first tile frame onto said first position on a surface of the model.

In an embodiment, the immersive video comprises a third tile stream, different from the first and second tile stream. In such embodiment the mapping information indicates for the third tile stream a third position on a surface of the two-dimensional or three-dimensional model. Such embodiment comprises, based on said tile stream mapping information and on a further viewport, determining a further plurality of tile streams including the first and third tile stream, and requesting encoded further video data from a server. The encoded further video data comprises, for each determined tile stream, an encoded further tile frame that comprises encoded further data representative of a further tile frame comprised in the tile stream. The encoded further video data comprises, for the third tile stream, an encoded further third tile frame that comprises encoded further data representative of a further third tile frame comprised in the third tile stream. Such embodiment comprises the tile frame retrieval device receiving the encoded further tile frames and forming an encoded further video frame. The encoded further video frame comprises the received encoded further tile frames including the encoded further third tile frame. Each encoded further tile frame has a position in the encoded further video frame. Such embodiment comprises the tile frame retrieval device generating further tile frame arrangement information indicating the position of each encoded further tile frame in the encoded further video frame. Such embodiment comprises the decoder device decoding the encoded further video frame to obtain a decoded further video frame comprising the further tile frames at respective positions within the decoded further video frame. Such embodiment comprises, based on the further tile frame arrangement information and based on the tile stream mapping information, the renderer device mapping the decoded further video frame onto one or more surfaces of the two-dimensional or three-dimensional model so that each further tile frame is mapped onto the position as indicated—by the mapping information—for the tile stream that comprises the further tile frame. Herewith the further third tile frame is mapped onto the third position on a surface of the model. Such embodiment comprises, based on the mapped decoded further video frame, the renderer device rendering at least part of the decoded further video frame on the display of the client device.

In an embodiment, said plurality of determined tile streams does not comprise the third tile stream.

The further plurality of tile streams may be associated with a further time instance and/or may be determined after the plurality of tile streams have been determined.

In such embodiment, the encoded further video frame may comprise the encoded further first tile frame at the first position with the encoded further video frame. Then, decoding the further encoded video frame comprises decoding the encoded further first tile frame based on the decoded first tile.

The decoder may only be able to use inter-coded frames if the linked frames are in the same position in the decoded video frames.

The decoded first tile frame may be stored in a buffer storage of the decoder device.

In an embodiment, the encoded further video frame comprises the encoded further third tile frame at said second position within the encoded further video frame and the decoded further video frame comprises the decoded further third tile frame at said second position within the decoded further video frame. In such embodiment, the rendering device may be configured to receive a decoded video frame and perform a decoded video frame specific mapping comprising mapping samples at positions in the received decoded video frame to respective positions on one or more surfaces of the two-dimensional or three-dimensional model in dependence of the tile frame arrangement information and the tile stream mapping information. Such embodiment comprises the decoder device decoding the encoded video frame and outputting the decoded video frame and, based on the tile stream mapping information and based on the tile frame arrangement information, the renderer device performing a first mapping comprising mapping the decoded video frame onto a surface of the two-dimensional or three-dimensional model so that the second tile frame is mapped onto the second position on a surface of the model. Such embodiment comprises the decoder device decoding the further encoded video frame and outputting the decoded further video frame, and, based on the tile stream mapping information and based on the further tile frame arrangement information, the renderer device performing a second mapping comprising mapping the decoded further video frame onto a surface of the model so that the further third tile frame is mapped onto the third position on a surface of the model.

This embodiment illustrates that the tile frames present in two separate decoded video frames, yet at the same position within the decoded video frames, can still be mapped to different positions on surfaces of them In an embodiment, the immersive video comprises high quality tile streams that each comprise high resolution tile frames and low-quality tile streams that each comprise low resolution tile frames. The model comprises one or more surfaces for the high-resolution tile frames and one or more surfaces for the low-resolution tile frames and a viewpoint. Preferably, the one or more surfaces for the high-resolution tile frames are in front of the one or more surfaces for the low-resolution tile frames as viewed from the viewpoint. The determined plurality of tile streams comprises at least one high quality tile stream and at least one low quality tile stream. Such embodiment comprises receiving, for the high-quality tile stream, an encoded high-resolution tile frame that comprises data representative of a high resolution tile frame comprised in the high quality tile stream, and receiving, for the low quality tile stream, an encoded low resolution tile frame that comprises data representative of a low resolution tile frame comprised in the low quality tile stream. Such embodiment further comprises, based on the tile stream mapping information and the tile frame arrangement information, mapping the decoded video frame onto one or more surfaces of the model, so that the high-resolution tile frame is mapped onto the one or more surfaces for the high-resolution tile frames and the low resolution tile frame mapped onto the one or more surfaces for the low resolution tiles.

The viewpoint may be understood to be the point in space where the center of a virtual camera, used by the rendering algorithm to compute the viewport, is positioned.

Preferably, the low-quality tile frames are mapped onto the model so that, for every possible viewing direction, one or more low quality tile frames completely fill up the viewport if there are no high quality tile frames available to fill the viewport.

The first tile stream may be a low-quality tile stream and the second tile stream may be a high quality tile stream.

Typically, the renderer device is configured to automatically display the decoded video data that is mapped on a surface closer to the viewpoint in front of other surfaces.

The gaming and rendering industry have developed many tools, such as OpenGL, WebGL, DirectX, Metal, and Vulkan, to exploit graphic cards for efficiently rendering viewports in a world composed of a high number of objects with complex shapes. In the context of immersive video those technologies can be reused to efficiently extract viewports based on a user's head orientation. I One aspect of this disclosure relates to a client device for rendering a spatial part of an immersive video on a display comprising a tile frame retrieval device, a decoder device and a renderer device, wherein the immersive video comprises video frames, each video frame being spatially divided in tile frames, and the immersive video comprises tile streams, each tile stream representing a spatial part of the immersive video and each tile stream comprising a plurality of said tile frames, and wherein the client comprises a storage for storing tile stream mapping information, that indicates for each tile stream a respective position on a surface of a two-dimensional or three-dimensional model, such as a sphere or cube, wherein the tile retrieval device is configured to, based on said tile stream mapping information and a viewport, determine a plurality of tile streams, and to request encoded video data from a server, the encoded video data comprising, for each determined tile stream, an encoded tile frame that comprises encoded data representative of a tile frame comprised in the tile stream, wherein the tile frame retrieval device is configured to receive the encoded tile frames and to form an encoded video frame comprising the received encoded tile frames, each encoded tile frame having a position in the encoded video frame, to generate tile frame arrangement information indicating the position of each encoded tile frame within the encoded video frame, wherein the decoder device is configured to decode the encoded video frame to obtain a decoded video frame comprising the tile frames at respective positions within the decoded video frame; wherein the renderer device is configured to, based on the tile frame arrangement information and based on the tile stream mapping information, map the decoded video frame onto one or more surfaces of the two-dimensional or three-dimensional model so that each tile frame is mapped onto the position as indicated—by the mapping information—for the tile stream that comprises the tile frame, wherein the renderer device is configured to, based on the mapped decoded video frame, render at least part of the decoded video frame on the display of the client device.

Another aspect of this disclosure relates to a method comprising one or more of the steps performed by the renderer device as described herein.

Another aspect of this disclosure relates to a renderer device that is configured to perform any of the methods performed by the renderer device as described herein.

Another aspect of this disclosure relates to a method comprising one or more of the steps performed by the tile frame retrieval device as described herein.

Another aspect of this disclosure relates to a message comprising render information as described herein.

Another aspect of this disclosure relates to computer program or suite of computer programs comprising at least one software code portion or a computer program product storing at least one software code portion, the software code portion, when run on a computer system, being configured for executing one or more of the methods as described herein.

Another aspect of this disclosure relates to a non-transitory computer-readable storage medium storing at least one software code portion, the software code portion, when executed or processed by a computer, is configured to perform one or more of the methods as described herein.

Another aspect of this disclosure relates to a computer-implemented method comprising the steps of any of the methods described herein.

Another aspect of this disclosure relates to a computer comprising a computer readable storage medium having computer readable program code embodied therewith, and a processor, preferably a microprocessor, coupled to the computer readable storage medium, wherein responsive to executing the computer readable program code, the processor is configured to perform any of the methods as described herein.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." For example, in an embodiment, the decoder device comprises one or more hardware decoders. For example, in an embodiment, the decoder device is a hardware decoder.

Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Moreover, a computer program for carrying out the methods described herein, as well as a non-transitory computer readable storage-medium storing the computer program are provided. A computer program may, for example, be downloaded (updated) to the existing systems (e.g. to the existing smartphones, or tablet computers) or be stored upon manufacturing of these systems.

Elements and aspects discussed for or in relation with a particular embodiment may be suitably combined with elements and aspects of other embodiments, unless explicitly stated otherwise. Embodiments of the present invention will be further illustrated with reference to the attached drawings, which schematically will show embodiments according to the invention. It will be understood that the present invention is not in any way restricted to these specific embodiments.

BRIEF DESCRIPTION OF THE DRAWINGS

Aspects of the invention will be explained in greater detail by reference to exemplary embodiments shown in the drawings, in which:

FIGS. 13A and 13B illustrate two methods for providing tile arrangement information and/or render information.

FIG. 14 shows an embodiment of render information

FIG. 15 shows another embodiment of render information.

DETAILED DESCRIPTION OF THE DRAWINGS

Figure 1:
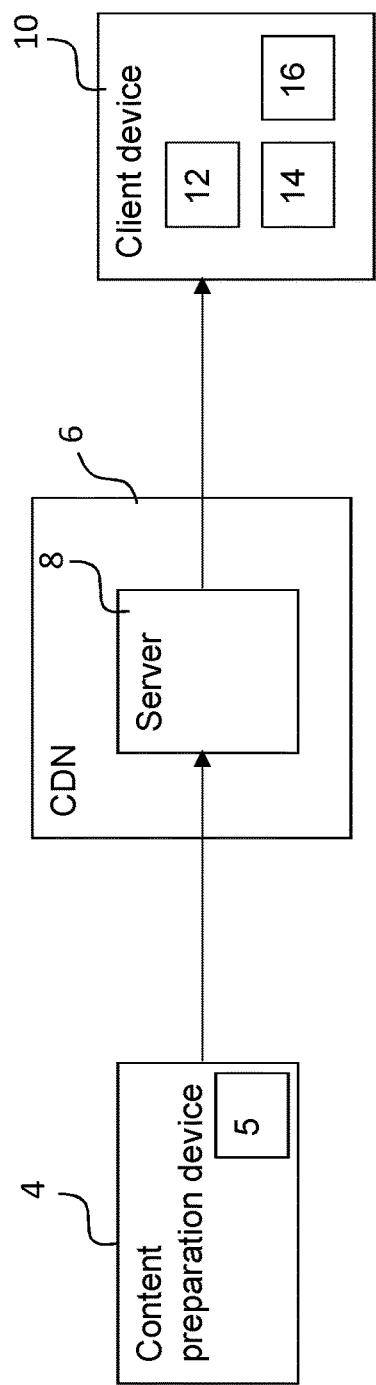
FIG. 1 shows a system according to an embodiment of the invention.

In the figure description, identical reference numerals may be understood to indicate identical or similar elements.

FIG. 1 shows a content preparation device 4, a content delivery network 8 and a client device 10 according to an embodiment. The content preparation device 4 may comprise an encoder device that is configured to encode video data. The content preparation device 4 may for example receive uncompressed video data representing an immersive video as captured by one or more cameras. Typically, an immersive video is captured by several differently oriented cameras. An immersive video is for example a 180 degrees video or a 360 degrees video. Any video of which only a varying spatial part is meant to be shown to the user may be regarded as an immersive video.

The encoder 5 may subsequently encode the raw video data. Preferably, the encoder device 5 outputs encoded tile frames as described herein. The content preparation device may be connected to the content delivery network, e.g. via a packet switched network such as the internet. The content delivery network 8 may comprise a plurality of servers 8. The content preparation device 4 may transmit the encoded tile frames to one or more servers 8 in the content delivery network 6 where the encoded tile frames are stored.

Optionally, the content preparation device also comprises an encryption module that is configured to encrypt the encoded tile frames.

The client device 10 may be connected to the content delivery network 6 via a packet switched network, such as the internet. The client device 10 comprises a tile retrieval device 12 according to an embodiment, a decoder device 14 and a renderer device 16 according to an embodiment. The client device 10 may request encoded video data, in particular may request particular encoded tile frames, from the content delivery network 6. In response, the content delivery network 6 may transmit the requested video data, in particular the requested encoded tile frames to the client device 10. The client device 10 can subsequently use the received encoded tile frames to render a spatial part of the immersive video.

The client device 10 may have stored a manifest file that indicates which encoded tile frames are stored on which particular server. Hence, the client device 10 may, after it has determined that a particular encoded tile frame is to be requested, use the manifest file to determine the server to which the request for the particular encoded tile frame is to be sent.

The client device may be a smart phone, tablet computer, desktop computer, television, head-mounted display, et cetera. The client device may also be an edge server. In such case, the rendering of the video may be performed on an edge server, and then the viewport may be streamed to the display of a user device. This enables devices having only the ability to decode regular videos can also benefit from tiled streaming methods.

The client device 10 may be configured to receive user interactions and determine, based on these user interactions, which spatial part of the video is to be rendered on the display. An example of a client device 10 is a head mounted display that is configured to receive user interactions in the sense that it can detect an orientation of a user's head onto which the head-mounted device is currently mounted. Another example would be a desktop computer that may be configured to receive user interactions through a keyboard or mouse. A user may for example use arrows on the keyboard to control which spatial part of the immersive video is presented at the display.

Figure 2:
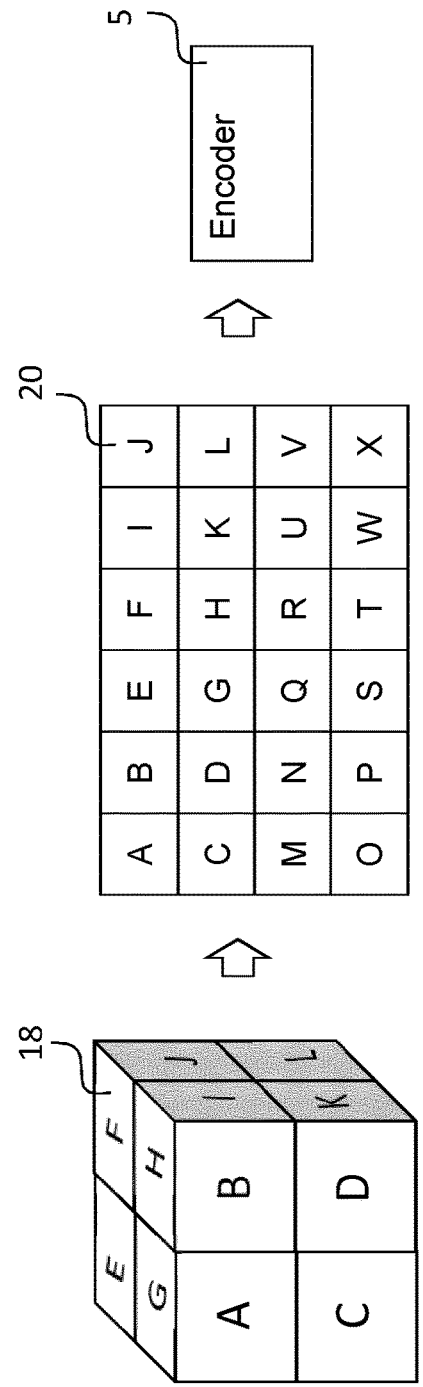
FIG. 2 visualizes a pre-encoding process.

FIG. 2 visualizes a pre-encoding process. After the raw video data has been obtained by the content preparation device, the content preparation device may map the raw video data onto a two-dimensional or three-dimensional model, such as a cube 18 as shown. Of course, when the raw video data has been captured by a plurality of cameras, these cameras may have overlapping field of views. Hence, for a good mapping onto cube 18 some of the raw video may need to be cropped for example. This mapping also requires the respective orientations of the different cameras so that the different videos are mapped onto a correct position on one or more surfaces of the cube 18.

After the raw video has been mapped onto the three-dimensional model, the raw video may be projected onto a two-dimensional frame 20. This may be required if the encoder 5 is configured to only encode two-dimensional frames.

Figure 3:
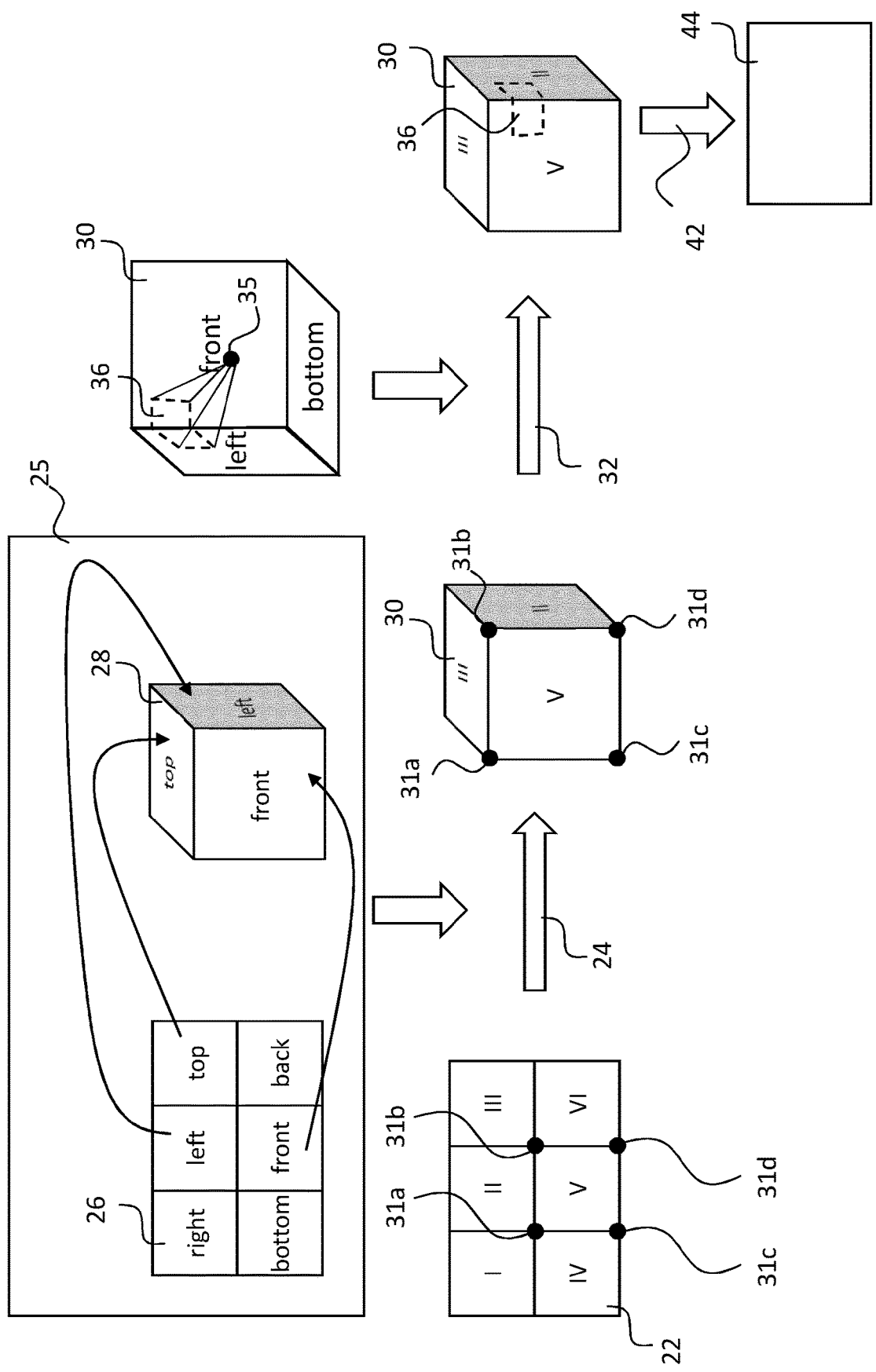
FIG. 3 shows a renderer process according to an embodiment.

FIG. 3 shows a renderer process according to an embodiment. In step 24, a decoded video frame 22 is mapped onto the three-dimensional model of cube 30. A decoded video frame may be understood to comprise a plurality of samples, e.g. pixels, that have a defined spatial relation with respect to each other.

Box 25 indicates the mapping 25 that is used for mapping the decoded video frame 22 onto cube 30. The mapping 25 shows that the renderer device will, for any decoded video frame 26 that it receives, map the middle lower area "front" onto the front surface "front" of the cube, and map the top middle area "left" onto the surface "left" as indicated on the cube 28, et cetera. Hence, when the renderer device receives decoded video frame 22, it will map area V at a first position in the decoded video frame 22 onto the front surface of the cube 28 and map the area II at a second position in the decoded video frame 22 onto the left surface of the cube 28, as shown.

As already mentioned, it is not required that in the mapping step 24 all samples that are present in the decoded video frame 22 are mapped onto the cube 30. The mapping step may only comprise determining for vertex 31*a* an associated position 31*a* in the decoded video frame 22, for vertex 31*b* an associated position 31*b* in the decoded video frame, et cetera as shown.

As a result of the mapping step, the decoded video frame 22 may be said to have been mapped onto cube 30.

In step 32 illustrates another rendering step. This step comprises determining the spatial part of one or more surfaces of the three-dimensional model that is present in the current viewport of the user as visualized by 34.

The three-dimensional model comprises a viewpoint 35. Based on user interactions with the client device, for example based on a current orientation of the client device, the spatial part 36 on the surface of the three-dimensional model can be determined to be in the viewport. It should be appreciated that the determination as to which part of one or more surfaces of the three-dimensional model is present in the viewport may be determined twice for each rendered video frame, namely once for determining which tile streams, in particular which tile frames the client device should retrieve from the server, and once just prior to rendering the decoded video frame on the display. This is beneficial, because the viewport may slightly change while retrieving the encoded tile frames and decoding and mapping step as described herein. By determining the part 36 of the surface of the cube 30 that is present in the viewport just prior to rendering, the user will not experience any latency when performing a user interaction that instructs a change of viewport, for example when the user changes the orientation of his head when wearing a head-mounted display as the client device as described herein. To this end, the renderer device is for example directly connected to a user interaction detection device in the client device, such as directly connected to one or more orientation sensors, so that the renderer device can receive the latest measured user interactions without delay.

Once, the spatial part 36 of the cube 30 present in the viewport has been determined, the renderer device can, based on the mapped decoded video frame, determine which sample values should be rendered at which positions on the display 44. The renderer device may comprise a graphics processing unit (GPU) to perform the required calculations. In an embodiment, step 42 comprises performing one or more ray tracing or rasterization algorithms.

Figure 4:
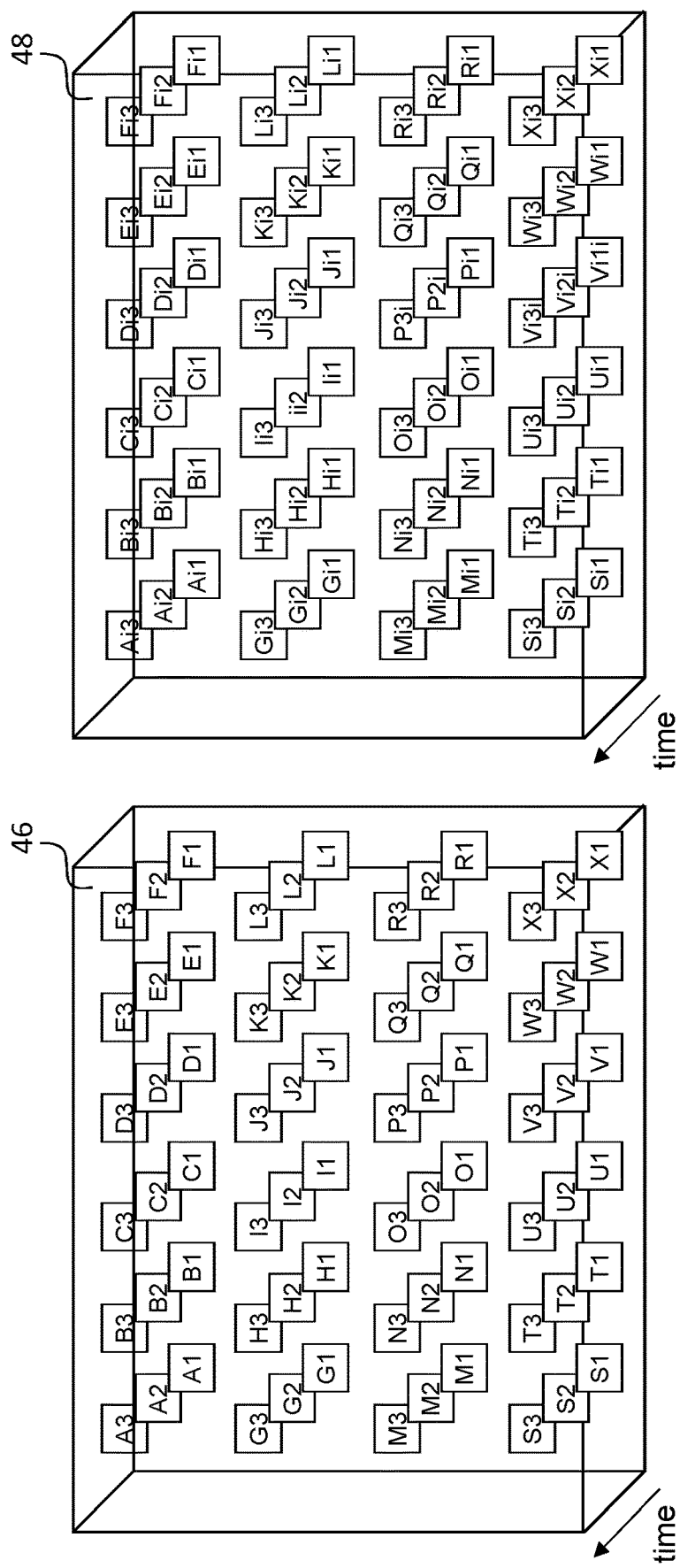
FIG. 4 visualizes encoded tile streams.

FIG. 4 visualizes encoded tile streams and thus encoded tile frames as may be stored on a server of the content delivery network. In this example, two sets of encoded tile frames are shown, namely 46 and 48. The capital letters A-X indicate the different tile streams, while the numerals 1-3 indicate a time stamp and/or a video frame identifier. Tile stream A for example comprises three separate tile frames, namely A1, A2, A3, tile stream B for example comprises the three tile frames B1, B2, B3, et cetera. The tile frames having the numeral "1" indicated may be understood to, together, comprise encoded video data representing the complete video frame of the complete immersive video, while tile frames having the numeral "2" indicated may be understood to, together, comprise encoded video data representing a further complete video frame of the complete immersive video.

Although only 24 tile streams are shown in FIG. 4, there may be many more tile streams, such as 54, or 108 tile streams.

The tile frames may be inter-coded tile frames, which may be understood as tile frames that are to be decoded on the basis of another decoded tile frame within the same tile stream. For example, tile frame Q2 may be an inter-coded tile frame in the sense that tile frame Q1 (in decoded form) is required for decoding encoded tile frame Q2.

The tile frames may be intra-coded tile frames, which may be understood as tile frames that can be decoded without reference to another decoded tile frame.

Set of encoded tile frames 48 may be understood to comprise encoded tile frames that comprise encoded video data relating to the same spatial parts of the immersive video as the encoded tile frames of set 46. However, the set of encoded tile frames 48 may be understood to comprise more intra-coded tile frames in each tile stream. In one example, all encoded tile frames in set 48 are intra-coded tile frames. The advantage of using two such sets of encoded tile frames is that the motion-to-high-resolution latency can be reduced as described in detail in WO2019/048426.

Figure 5:
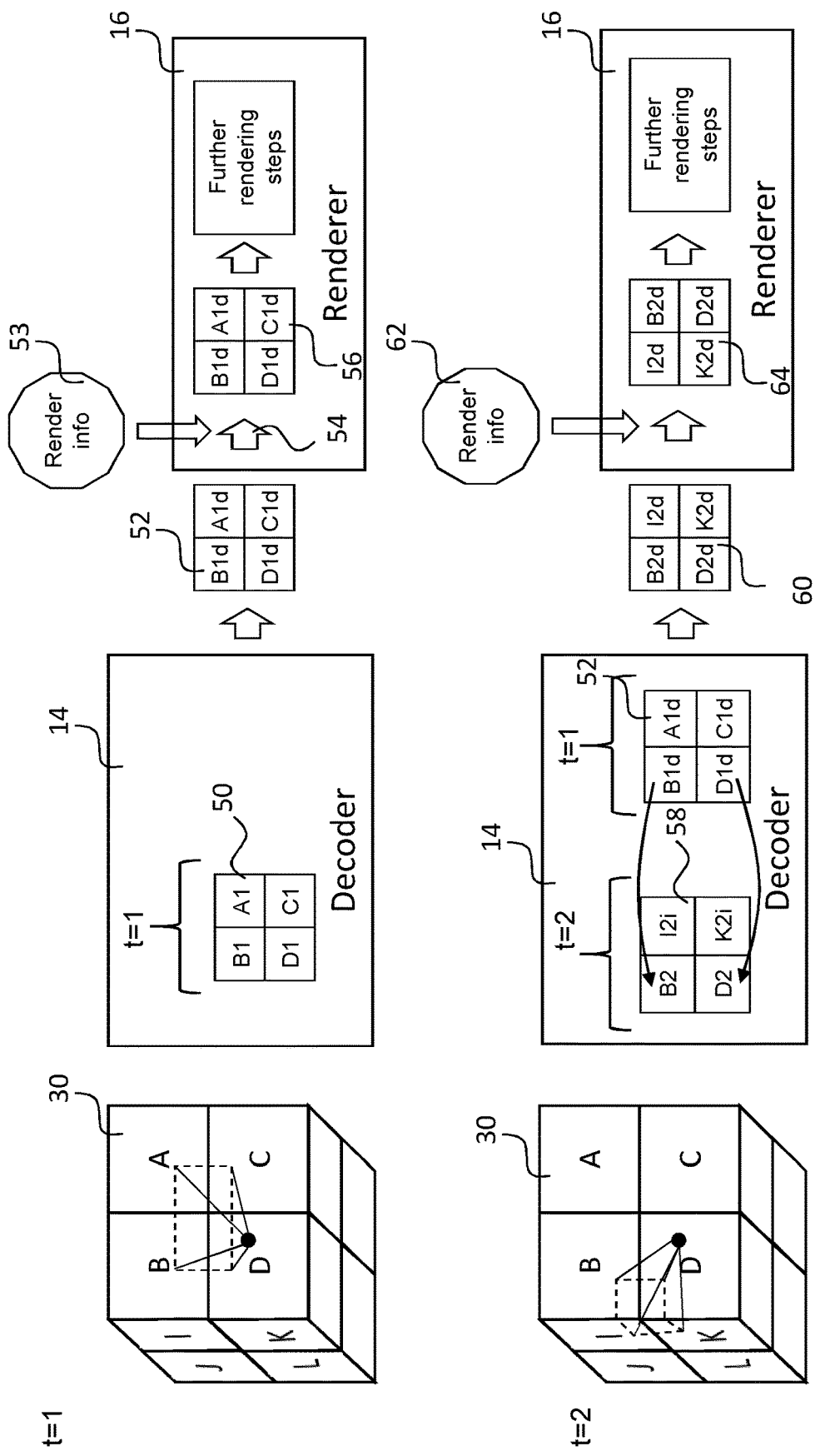
FIG. 5 shows an embodiment wherein tile frames are re-arranged in decoded video frames.

FIG. 5 shows an embodiment wherein at a first time instance t=1 the viewport comprises parts of tile streams A, B, C and D. Based on the determined viewport, the tile retrieval device has received encoded tile frames from tile streams A, B, C and D (from set 46 of encoded tile frames shown in FIG. 4). The tile retrieval device has formed an encoded video frame 50 that comprises these received encoded tile frames. The decoder 14 decodes this encoded video frame 50 and outputs a decoded intermediate video frame 52. Note that the "d" in the tile names indicate that it is a decoded version of the tile. Then, in step 54, the renderer device 16 determines the decoded video frame 56 based on the decoded intermediate video frame 52 and based on tile arrangement information 53. In this example, the decoded intermediate video frame 52 and the decoded video frame 56 are the same. Then, the renderer device 16 performs the rendering based on decoded video frame 56.

However, at a further time instance, namely at t=2, the viewport comprises parts of tile streams B, D, I, K. Hence, the tile retrieval device has requested and received encoded further tile frames B2, D2, I2$i$ and K2$i$ (that are also indicated in FIG. 4). Note that I2$i$ and K2$i$ are intra-coded frames and can thus be decoded independently from other decoded tile frames. However, in this example, B2 and D2 are inter-coded tile frames. In this case decoded tile frame B1$d$ is required for decoding encoded further tile frame B2 and decoded tile frame D1$d$ is required for decoding encoded further tile frame D2 as indicated by the arrows. Because of this coding dependency, preferably, the tiles B1 and B2 have the same position in their respective encoded video frames 50 and 58, and the tiles D1 and D2 have the same position in their respective encoded video frames 50 and 58.

The decoder 14 outputs a decoded further intermediate video frame 60. However, this frame 60 comprises the decoded tile streams B and D, in particular the decoded further tile frames B2$d$ and D2D at the same respective positions as B1$d$ and D1$d$ in the decoded intermediate video frame 52 although their position in the viewport has changed. Whereas B1$d$ and D1$d$ at t=1 are to be rendered on the left hand side of the viewport, the decoded tile frames B2$d$ and D2$d$ are to rendered on the right hand side of the viewport. Therefore, the renderer device determines the decoded video frame 64 on the basis of frame 60 and on the basis of the further tile arrangement information 62. Note that the further tile arrangement information 62 has been determined the tile retrieval device when it formed encoded video frame 58 as input for the decoder device 14.

FIG. 4 thus illustrates that it is often not possible to maintain a strict relationship between positions of encoded tile frames in the encoded video frame and position of the decoded tile frames in the viewport.

Figure 6:
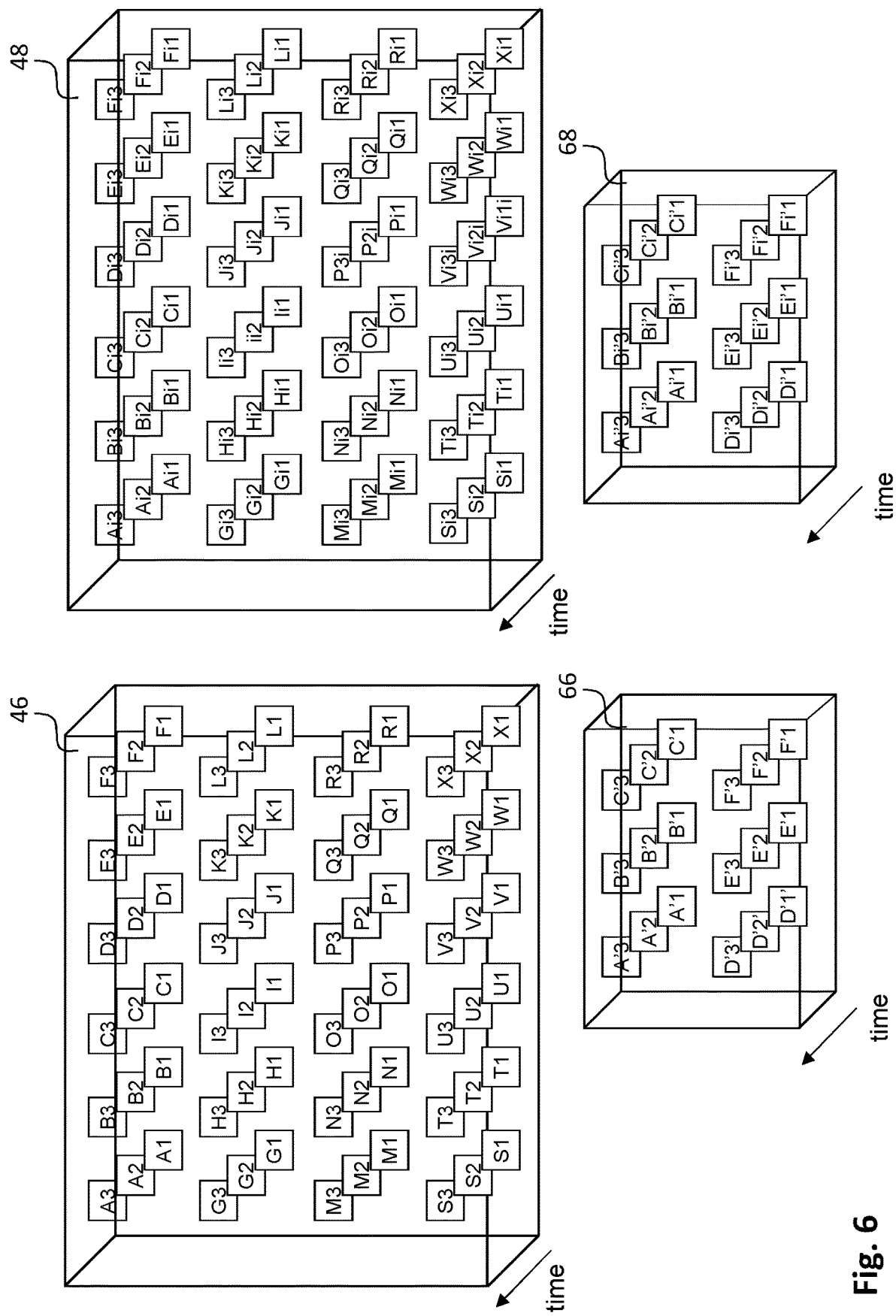
FIG. 6 illustrates a server having stored sets of encoded tile streams of different quality.

FIG. 6 illustrates that the server may have stored even further sets 66, 68 of encoded tile streams. These sets comprise encoded tile frames that represent tile frames of lower resolutions than the tile frames in sets 46, 48. The apostrophe in the tile names indicates a lower quality encoded tile frame.

This may be beneficial because, preferably, a viewport can always be filled with a decoded video data, irrespective of the viewing direction, because a viewport preferably also comprises decoded video data even if the user suddenly looks into an unexpected viewing direction. If, in such case, no decoded video data has been obtained for a part of the surface of the two-dimensional or three-dimensional model, which part is currently in the viewport, then the user would for example see black pixels, which would greatly distort the user experience. Therefore, for every video frame of the immersive video, low quality encoded tiles may be requested by the tile retrieval device so that all surfaces of the two-dimensional or three-dimensional model that can possibly be in the viewport, are completely covered by one or more decoded video frames.

Figure 7:
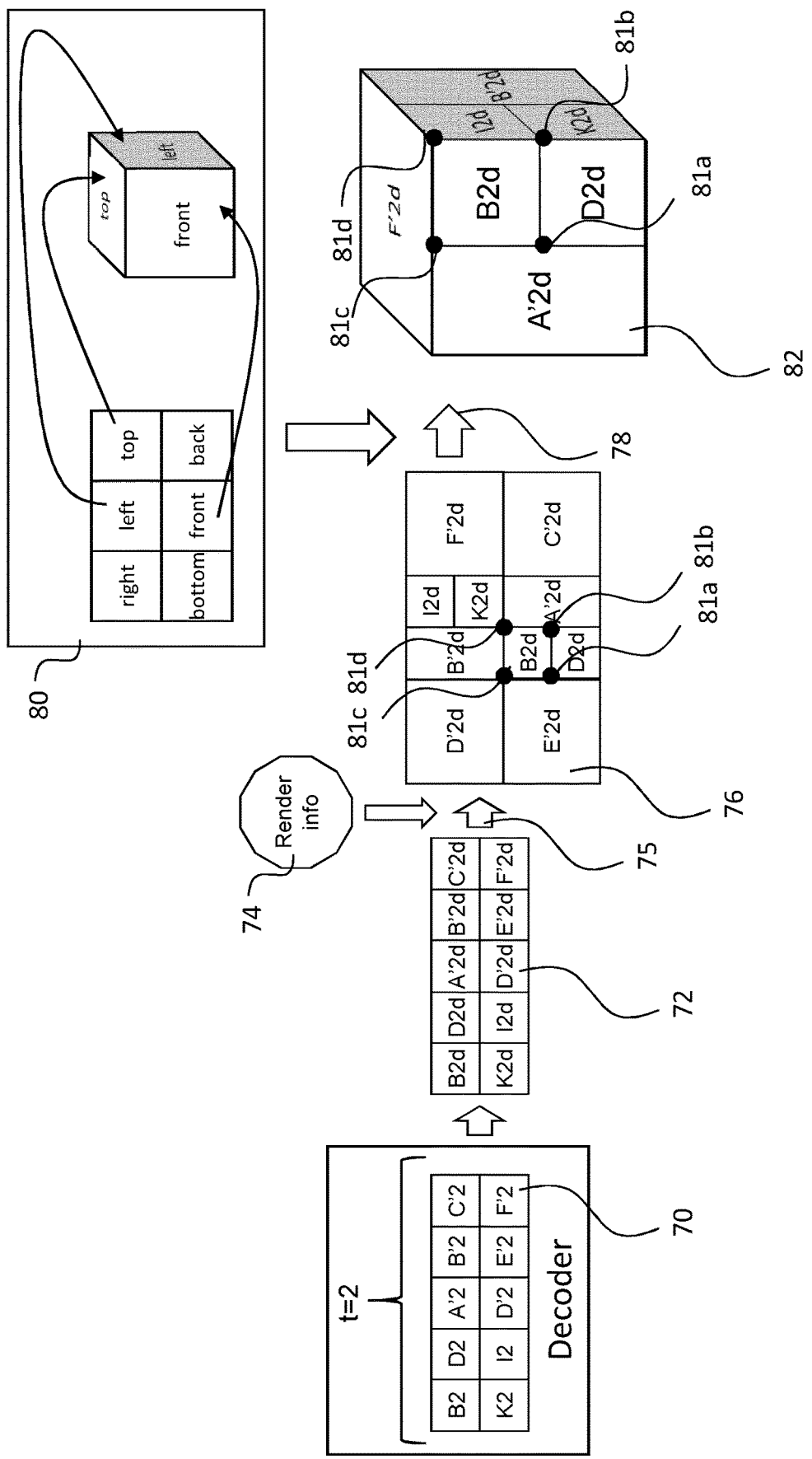
FIGS. 7 and 8 show a render process according to an embodiment.

FIG. 7 shows a render process according to one embodiment. Herein, the decoder has received an encoded video frame 70 from the tile retrieval device. As shown, the encoded video frame 70 comprises encoded low quality tiles A'-F'. These tiles together may be sufficient for completely covering all surfaces of the model. The encoded video frame 70 further comprises encoded tile frames B2, D2, I2, K2.

As shown, the decoder outputs a decoded intermediate video frame 72 comprising the decoded tile frames. Then, in step 75, the renderer device determines the decoded video frame 76 based on frame 72 and based on the tile arrangement information and based on the tile stream mapping information, or render information 74 determined based on the tile arrangement information and tile stream mapping information.

FIG. 7 visualizes that determining the decoded video frame 76 may comprise not only rearranging decoded tile frames, but also upscaling and/or cropping decoded tile frames. In one embodiment, the decoded low resolution tile frames are scaled up. In the depicted embodiment, the decoded tile frame D'2d is for example scaled up and the decoded tile frame B'2d is scaled up and cropped. It should be appreciated that upscaling a decoded tile frame is computationally intensive, because new samples need to be calculated.

The renderer device of FIG. 7 is configured to perform a predetermined mapping, that may be hard-coded into the renderer device. This predetermined mapping 80 is the same as the mapping shown in FIG. 3.

As a result, in step 78, the decoded video frame 76 is correctly mapped onto the cube. Note that the cube comprises vertices 81a-81d and mapping the decoded video frame onto the cube may comprise determining for these vertices an associated position in the decoded video frame 76 as shown.

After the mapping step, the renderer can display at least part of the video frame 76 on the display in dependence of a detected viewport.

Figure 8:
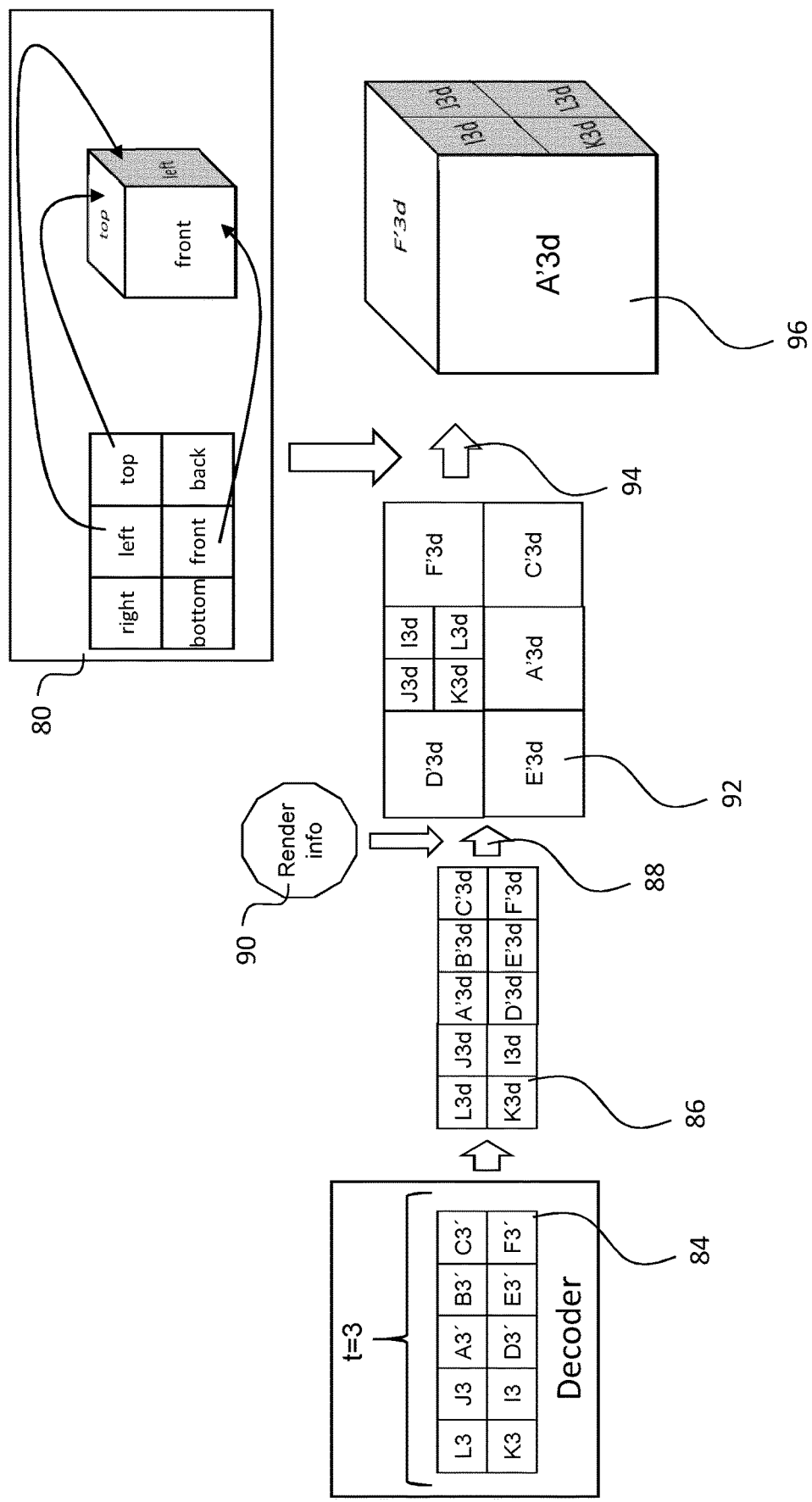

FIG. 8 shows a render process according to one embodiment. In particular, FIG. 8 illustrates the render process of FIG. 7 at a further time instance t=3. The decoder has received an encoded further video frame 84 from the tile retrieval device. As shown, again, the encoded further video frame comprises the low quality tile streams A' F'. These tiles streams may have fixed positions in the encoded video frames.

The decoder outputs decoded further intermediate video frame 86 that comprises the decoded tile frames. It should be noted that, since the renderer device is configured to perform a predetermined mapping, the mapping 80 that is used in FIG. 8 for step 94 is the same as mapping 80 that was used in step 78 of the of FIG. 7. Therefore, in order to ensure correct mapping of the decoded tile frames onto the cube, the renderer device, in step 88, determines a decoded further video frame based on the decoded intermediate video frame 86 and based on further tile arrangement information and based on the tile stream mapping information, or based on render information 90 that has been determined, for example by the tile retrieval device, based on the further tile arrangement information and the tile stream mapping information. As shown, the decoded high resolution tiles J3d, I3d, K3d, L3d, are positioned in the decoded video frame 92 at the top middle area, that is mapped, in accordance with mapping 80, onto the left face of the cube. These encoded tile frames should indeed be mapped to this left face of the cube as also shown in FIG. 2.

Figure 9:
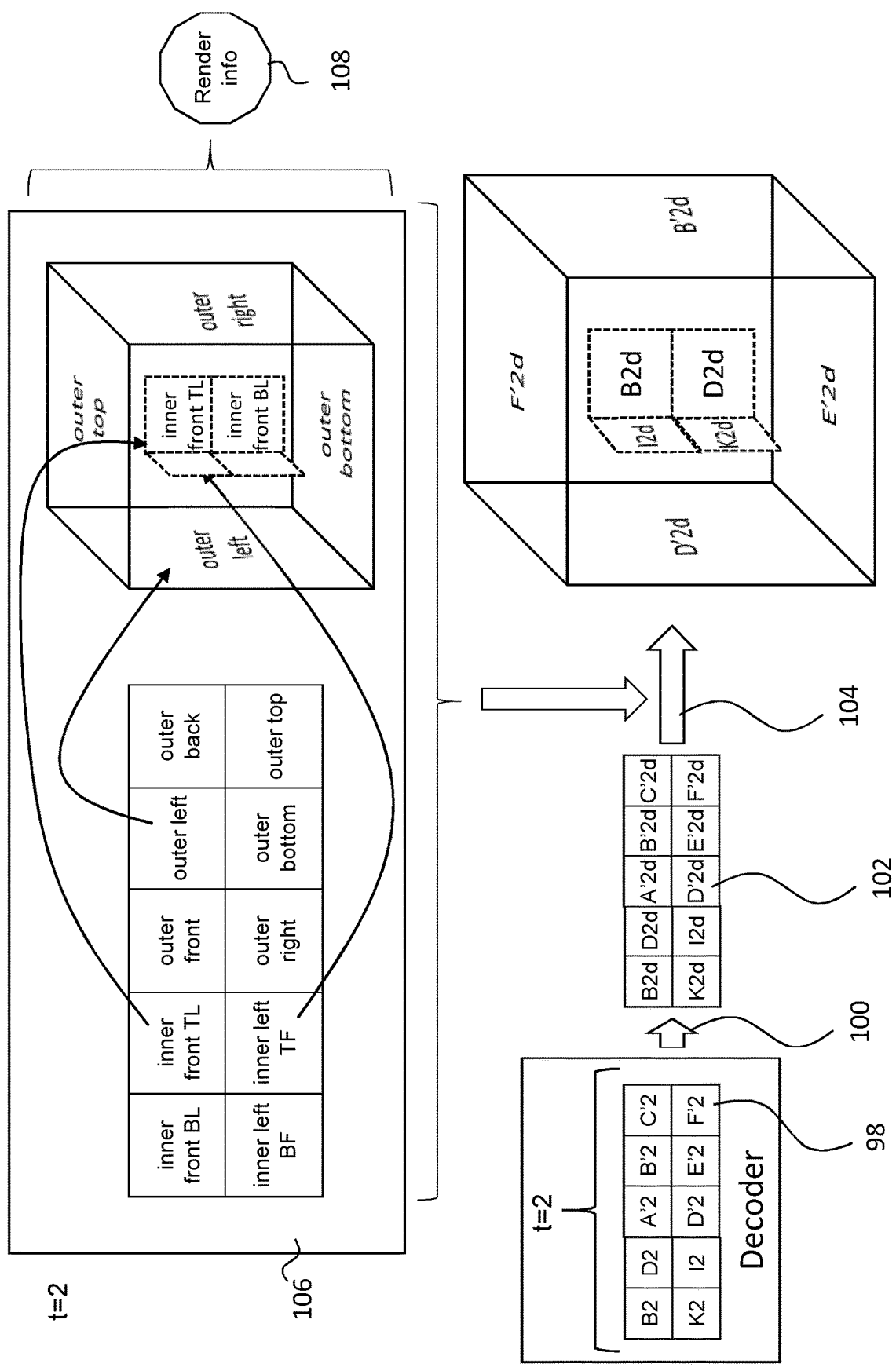
FIGS. 9 and 10 relate to an embodiment wherein the renderer device is configured to perform a decoded video frame specific mapping.
Figure 10:
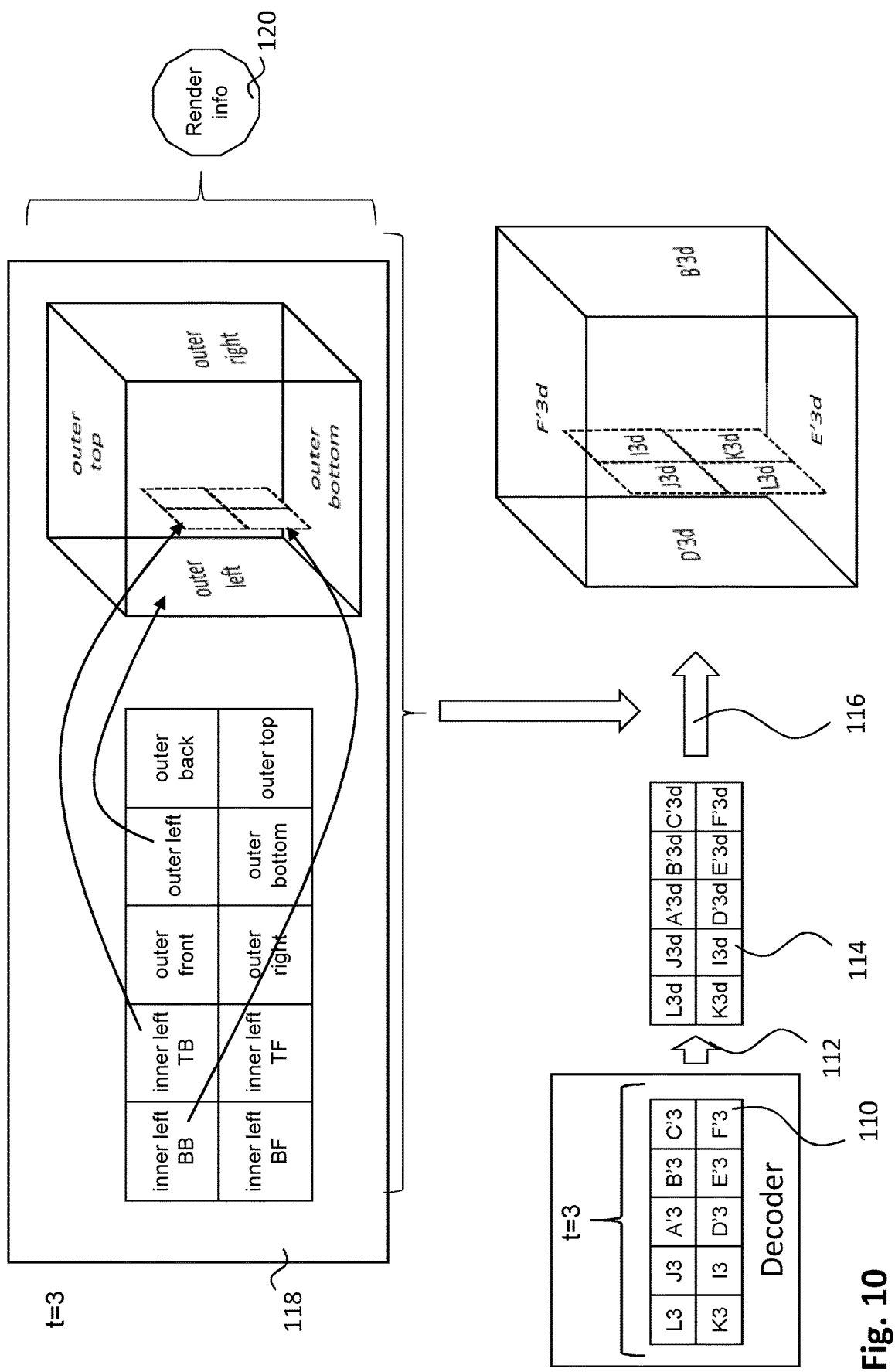

FIGS. 9 and 10 relate to an embodiment wherein the renderer device is configured to perform a decoded video frame specific mapping. The renderer device may thus perform a different mapping for each decoded video frame.

As shown in FIG. 9, at a first time instance t=2, the decoder has received encoded video frame 98 from the tile retrieval device. This is the same encoded video frame as in FIG. 7. The decoder decodes the encoded video frame 98 and outputs decoded video frame 102, which is similar to the decoded video frame in FIG. 7.

In the embodiment of FIG. 9, a three-dimensional model is used that comprises one or more surfaces for high-resolution decoded tile frames and surfaces for low-resolution tile frames. In particular, a three-dimensional model is used that comprises surfaces forming an outer cube and surfaces forming an inner cube. In this embodiment, the surfaces of the inner cube are for high-resolution tile frames and the surfaces of the outer cube are for low-resolution tile frames. In the depicted embodiment, the inner cube comprises surfaces onto which a total of 24 decoded tile frames can be mapped, four on each of the six faces of the inner cube (that is, if no tile selection would be made by the tile retrieval device).

Based on the tile arrangement information and the tile stream mapping information or the render information 108 derived from the tile arrangement information and the tile stream mapping information, the renderer device has determined a mapping 106. As shown, the determined mapping 106, that has thus been specifically determined for decoded video frame 102, determines that the area in a received decoded video frame, which area is indicated by "inner front TL", should be mapped to a surface of the three-dimensional model indicated by "inner front TL", which is a surface of the inner cube.

Further, the mapping 106 determines that the area in a received decoded video frame, which area is indicated by "outer left" will be mapped onto a surface of the three-dimensional model indicated by "outer left", which is a surface of the outer cube, thus in this case a surface for a low resolution decoded tile frame.

Then, FIG. 10 shows a further encoded video frame 110 that comprises a different set of encoded tile frames than the encoded video frame 98. The decoder outputs the decoded further video frame 114. Again, the renderer device has determined a further mapping 118 based on further tile arrangement information and based on tile stream mapping information, or based on render information 120 as described herein. The further tile frame arrangement information indicates the position of each encoded tile frame in the encoded video frame 110 and herewith may be understood to also indicate the position of each decoded tile frame in the decoded video frame 114.

The determined mapping 118 determines that the area in a received decoded video frame marked by "inner left TB", which is the same area as the area that was marked by "inner front TL" in FIG. 9, is mapped onto a different surface of the three-dimensional model, i.e. different from the surface of the three-dimensional model that was marked in FIG. 9 by "inner front TL". The decoded low-resolution tile frames may be mapped in a predetermined manner.

Figure 11B:
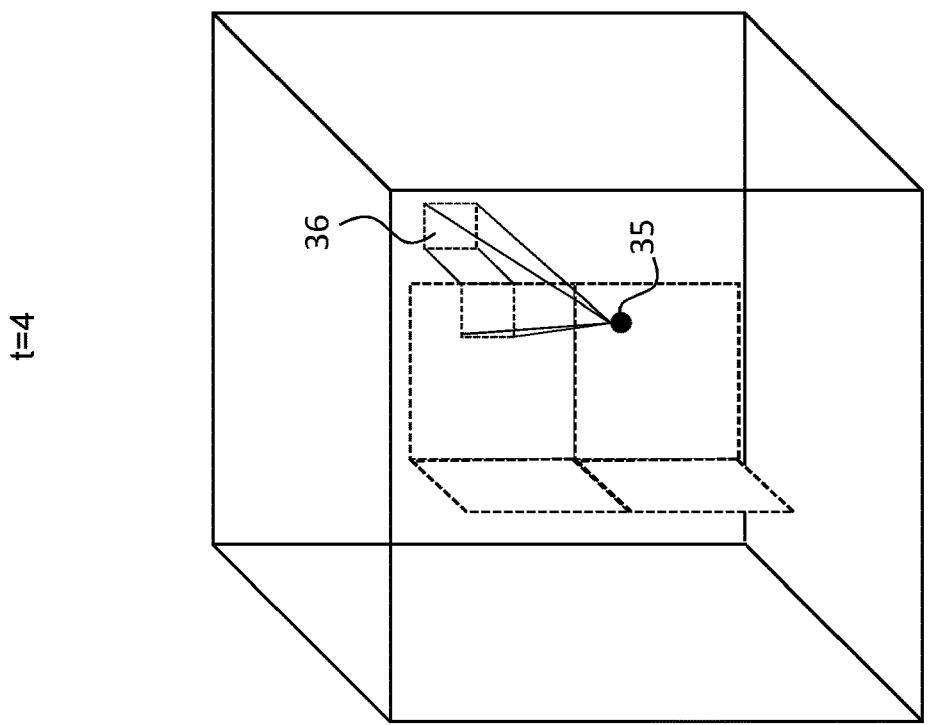
FIGS. 11A and 11B illustrate that the viewport may comprise video data of varying quality.
Figure 11A:
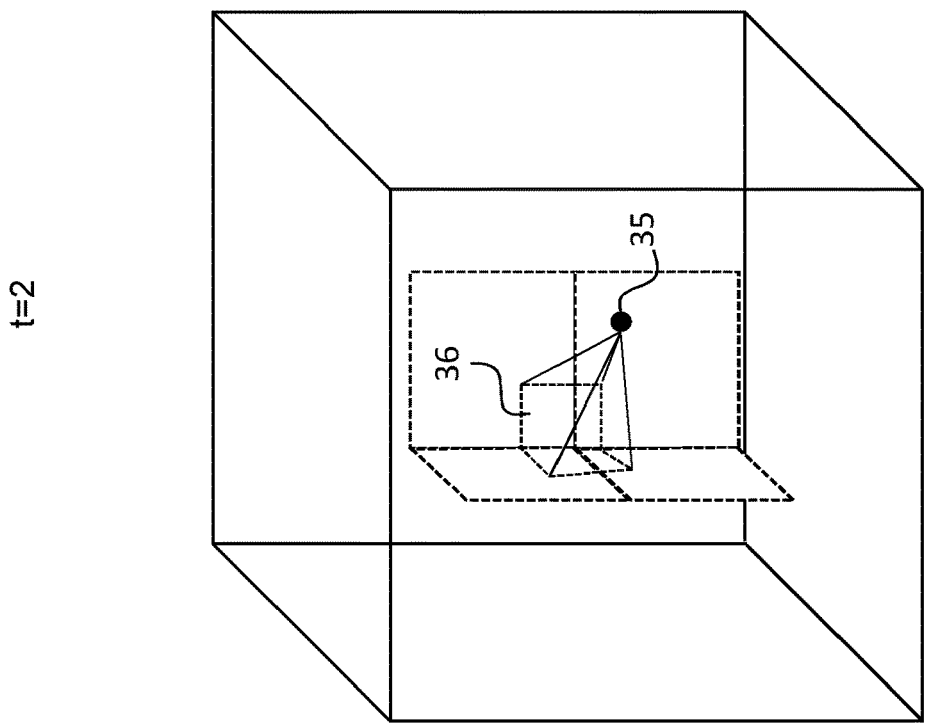

FIGS. 11A and 11B illustrate a certain mapping onto a three-dimensional model that comprises a first set of one or more surfaces for decoded low-resolution tile frames and a second set of one or more surfaces for decoded high-resolution tile frames, wherein the second set of one or more surfaces is positioned in front of the first set of one or more surfaces as viewed from a viewpoint 35, high or low resolution video will be rendered on the display depending on the viewport. FIGS. 11A and 11B shows surfaces of the outer cube as described above and some surfaces of the inner cube. In fact, it may be understood that FIG. 11 only shows the surfaces onto which decoded video frames have been mapped by the renderer device.

Of course, the model may also comprise one or more surfaces for decoded medium resolution tiles. In the cube model depicted such surfaces would form a cube that is smaller than the outer cube and larger than the inner cube, wherein the three cubes have coinciding center points.

In FIG. 11A, the situation is depicted wherein only high-resolution decoded tile frames are present in the viewport. In this situation, only high-resolution video would be rendered on the display.

However, if the viewport suddenly changes, it may be that some decoded high-resolution tile frames have not been decoded, so that part of the viewport, or the entire viewport comprises the decoded low-resolution tile frames. This is depicted in FIG. 11B, wherein the viewport comprises part of a decoded high-resolution tile frame and part of a decoded low-resolution tile frame.

Figure 12:
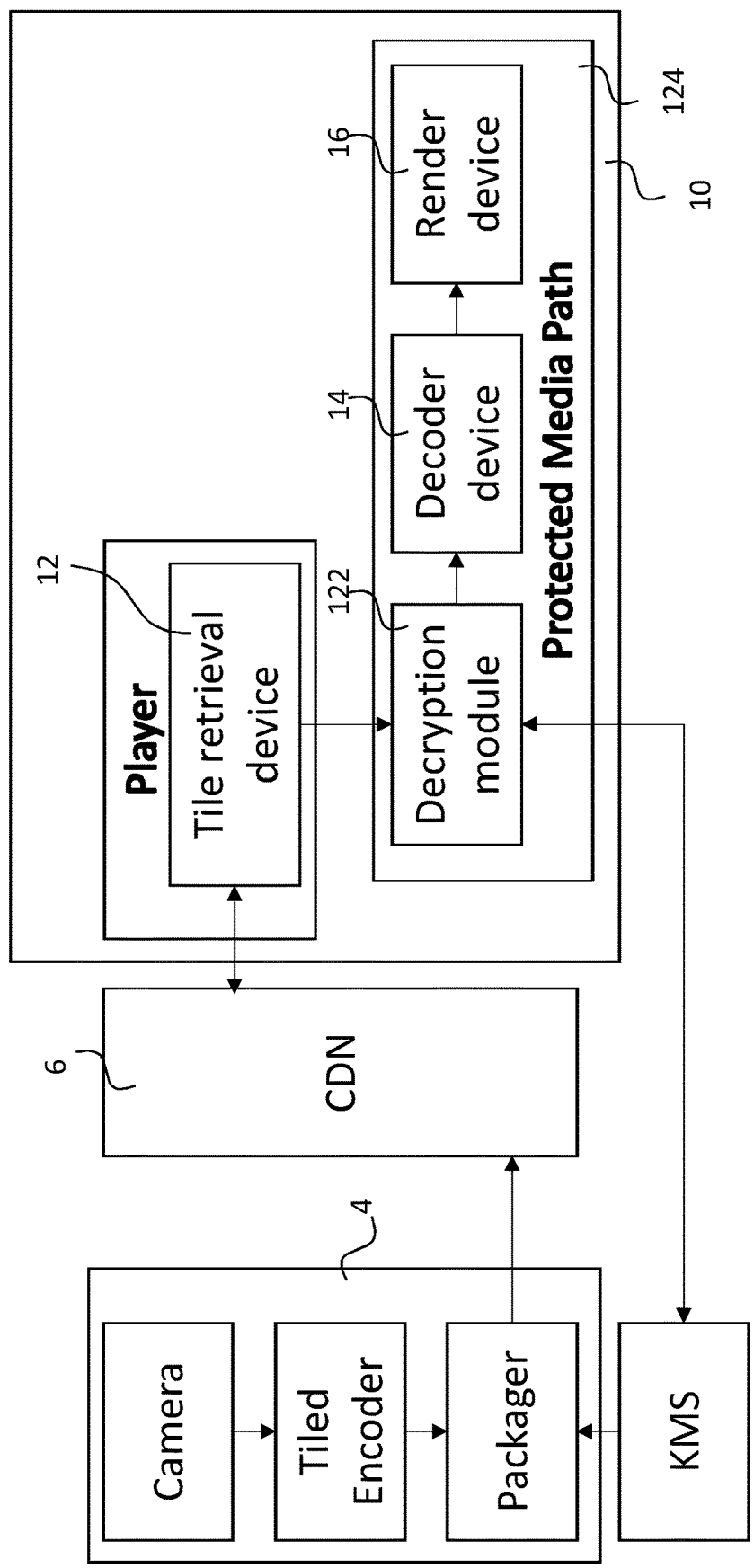
FIG. 12 shows an embodiment, wherein the client device comprises a protected media path.

FIG. 12 shows an embodiment, wherein the client device comprises a protected media path that is configured to prevent addition of the tile frame arrangement information and/or the render information to encoded video frames and/or configured to prevent addition of the tile frame arrangement information and/or the render information to decoded video frames. Typically, a protected media path, such as a secure video path, does not allow the client device to adapt the decrypted video frames (decoded or encoded), for example to prevent that an illegal copy of the decrypted content is made.

The embodiment of the client device 10 of FIG. 12 also comprises a decryption module 122 that is configured to retrieve a key, for example from a key management server (KMS). The key management server may have provided the key to the content preparation device, in which an encryption module has encrypted the encoded video frames that have been encoded by an encoder device.

The tile frame retrieval device may be configured to control the playback of the video by detecting user interactions with the client device and providing playback instructions to the renderer device in accordance with these user interactions. The tile retrieval device may also be referred to as a client application.

The protected media path typically comprises the data flow path from the decryption module to decoder device to renderer device, which means that, once the encrypted encoded tile frames have been provided to the decryption module 122, the client device, in particular the tile retrieval device can no longer access the tile frames.

It should be appreciated that in more traditional immersive video streaming, the content preparation device may package render information into the generated bitstream that the content preparation will encode and, optionally, encrypt. This render information may then later be used by the renderer device to properly render at least part of the immersive video. However, because in this case, upon detection of a viewport, the selected video data still needs to be encoded, and optionally encrypted, such traditional immersive video streaming methods are associated with high latencies.

FIGS. 13A and 13B illustrate two respective methods for the tile retrieval device 12 to provide tile arrangement information and/or render information derived from the tile arrangement information to the renderer device 16. FIG. 13A shows that such information may be passed through the decryption module 122 and decoder device 14 to the renderer device. In this embodiment, such information preferably is separate from the bitstream that comprises the encoded or decoded video frames.

FIG. 13B shows an embodiment, wherein the tile arrangement information and/or the render information are passed to the renderer device 16 via a storage 126, thus outside of the protected media path. Having the storage 126 outside the protected media path does not introduce any security breach as it only affects how the renderer device will generate the viewport but will not change anything about how the renderer safely displays the viewport. The viewport and the decoded video data are safely stored in the memory.

FIG. 14 shows an embodiment of render information as described herein. In this embodiment, the render information comprises two syntaxes. Syntax 127 comprises information 128 indicating a frame identifier for a decoded video frame, and information 130 indicating the resolution of the decoded video frame, and information 132 indicating what of two-dimensional or three-dimensional model is used for rendering, such as a cube sphere or plane, information 134 indicating pixels that do not contain decoded video data, information 136 indicating information required for rendering stereoscopic videos. Syntax 129 is present for every tile frame and comprises information 138 indicating the quality of the decided tile frame, information 140 indicating the position of the top left corner of the decoded tile frame in the decoded video frame and information 142 indicating the width and height of the decoded tile frame (allowing to compute the corners of every tile frame within the decoded video frame), information 144 extra padding inside the tile frame at the edges of the decoded tile frame. The position of the tile frames in syntax 129 indicate the tile stream.

FIG. 15 shows an embodiment of render information as described herein. This render information may be sent as a render information message from the tile retrieval device to the renderer device.

The semantics of this render information may be as follows.

num_regions specifies the number of packed regions. Typically, the packed regions together form a full tile frame.

packed_picture_width and packed_picture_height specify the width and height, respectively, of the packed picture, in relative packed picture sample units, thus define the resolution of the decoded video frame.

packed_picture_width and packed_picture_height are preferably both greater than 0.

guard_band_flag equal to 0 specifies that none of the regions have a guard band. A guard band may be understood to be extra padding at tile frame edges. guard_band_flag equal to 1 may specify that all regions have at least one guard band.

packed_map_type specifies the type of region description used for the i-th region. This parameter may be understood to specify the shape of the tile frame, such as rectangular or triangular.

mesh_type specifies the type of the mesh description used for the i-th region. This parameter may be understood to indicate whether the three dimensional model or two-dimensional model is formed by surface parts of a sphere or by parallelograms, such as rectangles.

The for loop is preferably executed for all tile frames.

eye[i] specifies the eye associated with the texture inside the i-th region. If eye[i]==0 the texture may be for the left eye; if eye[i]==1 the texture may be for the right eye. For mono video eye[i] may be set to 0.

SphereRegionStruct specifies a spherical mesh as the spherical region specified in the struct as defined in WD5 of ISO/IEC 23090-2 OMAF 2nd edition section 6.8.6.2

3DParallelogram specifies a parallelogram mesh in the 3D space. The origin vertex correspond to the Top Left point in the RectPackedRegion( ). The vertex origin+u_dir correspond to the Top Right point in the RectPackedRegion( ) and origin+v_dir to the Bottom Left point in RectPackedRegion( ). This object defines the position on a surface of the model onto which the decoded tile frame is to be mapped.

RectPackedRegion specifies a rectangular region in the packed picture (the decoded video frame). The RectPackedRegion may be non-overlapping. This parameter defines the width, height and position of the tile frames in the decoded video frame.

GuardBand specifies the potential guard bands around the RectPackedRegion. The syntax and semantics of GuardBand(i) are specified below.

Figure 16:
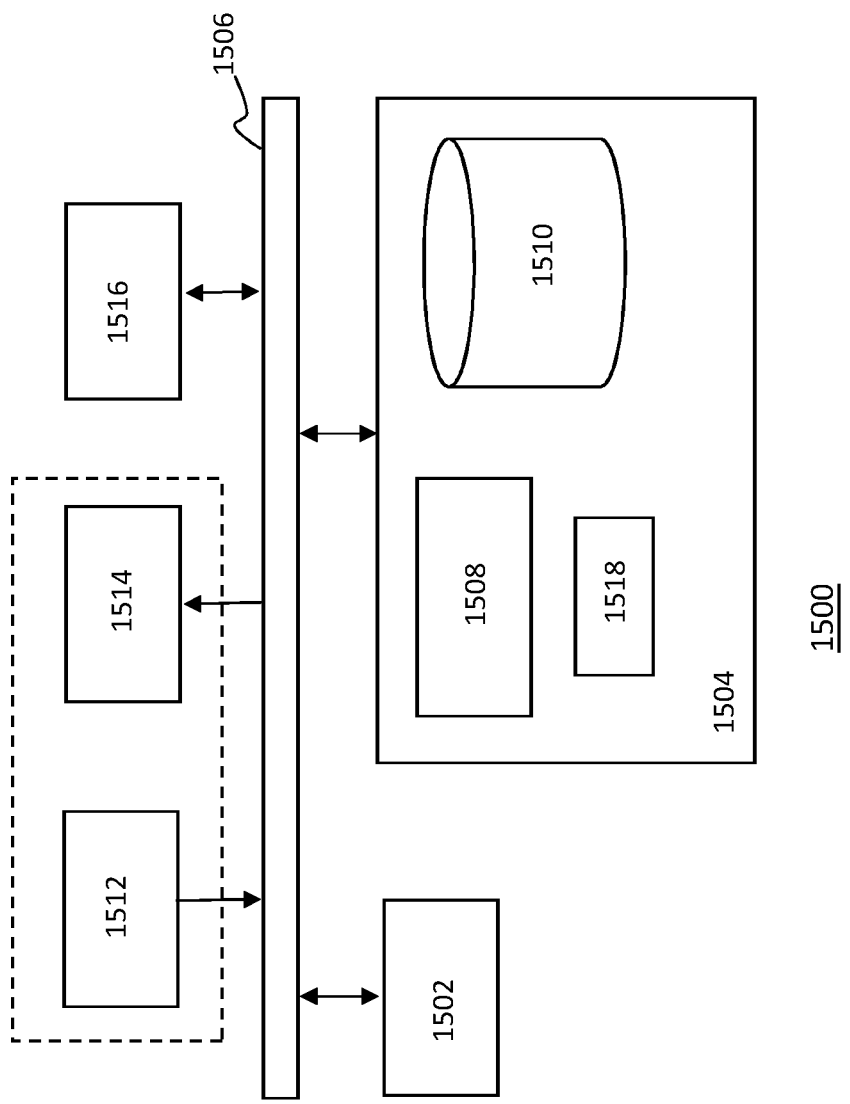
FIG. 16 depicts a block diagram illustrating an exemplary data processing system according to an embodiment.

FIG. 16 depicts a block diagram illustrating an exemplary data processing system according to an embodiment.

As shown in FIG. 16, the data processing system 1500 may include at least one processor 1502 coupled to memory elements 1504 through a system bus 1506. As such, the data processing system may store program code within memory elements 1504. Further, the processor 1502 may execute the program code accessed from the memory elements 1504 via a system bus 1506. In one aspect, the data processing system may be implemented as a computer that is suitable for storing and/or executing program code. It should be appreciated, however, that the data processing system 1500 may be implemented in the form of any system including a processor and a memory that is capable of performing the functions described within this specification.

The memory elements 1504 may include one or more physical memory devices such as, for example, local memory 1508 and one or more bulk storage devices 1510. The local memory may refer to random access memory or other non-persistent memory device(s) generally used during actual execution of the program code. A bulk storage device may be implemented as a hard drive or other persistent data storage device. The processing system 1500 may also include one or more cache memories (not shown) that provide temporary storage of at least some program code in order to reduce the number of times program code must be retrieved from the bulk storage device 1510 during execution.

Input/output (I/O) devices depicted as an input device 1512 and an output device 1514 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 16 with a dashed line surrounding the input device 1512 and the output device 1514). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 1516 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 1500, and a data transmitter for transmitting data from the data processing system 1500 to said systems, devices and/or networks. Modems, cable modems, and Ethernet cards are examples of different types of network adapter that may be used with the data processing system 1500.

As pictured in FIG. 16, the memory elements 1504 may store an application 1518. In various embodiments, the application 1518 may be stored in the local memory 1508, the one or more bulk storage devices 1510, or apart from the local memory and the bulk storage devices. It should be appreciated that the data processing system 1500 may further execute an operating system (not shown in FIG. 16) that can facilitate execution of the application 1518. The application 1518, being implemented in the form of executable program code, can be executed by the data processing system 1500, e.g., by the processor 1502. Responsive to executing the application, the data processing system 1500 may be configured to perform one or more operations or method steps described herein.

In one aspect of the present invention, the data processing system 1500 may represent a client device and/or tile retrieval device and/or decoder device and/or renderer device and/or server and/or content preparation device as described herein.

In another aspect, the data processing system 1500 may represent a client data processing system. In that case, the application 1518 may represent a client application that, when executed, configures the data processing system 1500 to perform the various functions described herein with reference to a "client". Examples of a client can include, but are not limited to, a personal computer, a portable computer, a mobile phone, or the like.

In yet another aspect, the data processing system 1500 may represent a server, e.g. a server having stored thereon one or more encoded tile frames. For example, the data processing system may represent an (HTTP) server, in which case the application 1518, when executed, may configure the data processing system to perform (HTTP) server operations.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 1502 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A method for rendering a spatial part of an immersive video on a display of a client device comprising a tile frame retrieval device, a decoder device and a renderer device, wherein
the immersive video comprises video frames, each video frame being spatially divided in tile frames, and the immersive video comprises tile streams, each tile stream representing a spatial part of the immersive video and each tile stream comprising a plurality of said tile frames, and
the client has stored tile stream mapping information, that indicates for each tile stream a respective position on a surface of a two-dimensional or three-dimensional model, the method comprising steps of;
based on said tile stream mapping information and a viewport, determining a plurality of tile streams by the tile frame retrieval device, and requesting encoded video data from a server, the encoded video data comprising, for each determined tile stream, an encoded tile frame that comprises encoded data representative of a tile frame comprised in the tile stream;
receiving, by the tile frame retrieval device, the encoded tile frames and forming an encoded video frame comprising the received encoded tile frames, each encoded tile frame having a position in the encoded video frame, and the tile frame retrieval device generating tile frame arrangement information indicating the position of each encoded tile frame within the encoded video frame;
decoding, by the decoder device, the encoded video frame to obtain a decoded video frame comprising the tile frames at respective positions within the decoded video frame;
based on the tile frame arrangement information and based on the tile stream mapping information, mapping, by the renderer device, the decoded video frame onto one or more surfaces of the two-dimensional or three-dimensional model so that each tile frame is mapped onto the position of the one or more surfaces of the model; and
rendering, by the renderer device, at least part of the decoded video frame on the display of the client device, said rendering being based on the mapped decoded video frame.

2. The method according to claim 1, wherein the renderer device is configured to perform a predetermined mapping when mapping a decoded video frame onto one or more surfaces of the model, the method comprising of steps of:
decoding, by the decoder device, the encoded video frame and outputting an intermediate decoded video frame comprising the tile frames at respective positions within the intermediate decoded video frame, and
determining the decoded video frame based on the tile stream mapping information and on the tile frame arrangement information, comprising re-arranging tile frames such that at least one tile frame has a different position in the intermediate decoded video frame than in the decoded video frame, and
performing the predetermined mapping by the render device.

3. The method according to claim 2, wherein the renderer device is configured to determine a mapping for a decoded video frame in dependence on the associated tile arrangement information, the method comprising steps of:
decoding, by the decoder device, the encoded video frame and outputting the decoded video frame, and
mapping the decoded video frame in accordance with the determined mapping onto one or more surfaces of the model.

4. The method according to claim 1, wherein the renderer device is configured to determine a mapping for a decoded video frame in dependence on the associated tile arrangement information, the method comprising steps of:
decoding, by the decoder device, the encoded video frame and outputting the decoded video frame, and
mapping the decoded video frame in accordance with the determined mapping onto one or more surfaces of the model.

5. The method according to claim 4, comprising a step of:
determining, by the tile frame retrieval device, render information based on the tile stream mapping information and based on the tile frame arrangement information, and
providing, by the tile frame retrieval device, the render information to the renderer device, and
performing, by the renderer device, the mapping based on the render information.

6. The method according to claim 1, comprising a step of:
determining, by the tile frame retrieval device, render information based on the tile stream mapping information and based on the tile frame arrangement information, and
providing, by the tile frame retrieval device, the render information to the renderer device, and
performing, by the renderer device, the mapping based on the render information.

7. The method according to claim 6, wherein the encoded video frame comprises a frame identifier, and the tile arrangement information and/or render information comprises said frame identifier, the method comprising steps of:
determining, by the render device, that the frame identifier of the decoded video frame matches the frame identifier of the tile arrangement information and/or render information, and
based on this determination, using the tile arrangement information and/or render information, by the render device, for mapping the decoded video frame onto one or more surfaces of the two-dimensional or three-dimensional model.

8. The method according to claim 6, wherein the render information indicates, for every vertex of the model, an associated position in the decoded video frame.

9. The method according to claim 1, wherein
the client device comprises a protected media path that is configured to prevent addition of the tile frame arrangement information and/or the render information to encoded video frames and/or configured to prevent addition of the tile frame arrangement information and/or the render information to decoded video frames, the method comprising a step of;
providing, by the tile frame retrieval device, the render information and/or the tile stream mapping information and/or the tile frame arrangement information to the renderer device outside of the protected media path.

10. The method according to claim 1, wherein
the determined plurality of tile streams comprises a first tile stream and a second tile stream, and
the mapping information indicates for the first tile stream a first position on a surface of the model and indicates for the second tile stream a second position on a surface of the model,
the encoded video data comprises, for the first tile stream, an encoded first tile frame that comprises encoded data representative of a first tile frame comprised in the first tile stream and comprises, for the second tile stream, an encoded second tile frame that comprises encoded data representative of a second tile frame comprised in the second tile stream, the method comprising steps of;
receiving, by the tile frame retrieval device, the encoded first tile frame and encoded second tile frame and forming the encoded video frame comprising the received encoded tile frames, the first encoded tile frame having a first position in the encoded video frame and the second encoded tile frame having a second position in the encoded video frame;
decoding, by the decoder device, the encoded video frame to obtain a decoded video frame comprising the first tile frame at a first position within the decoded video frame and the second tile frame at a second position within the decoded video frame; and
based on the tile frame arrangement information and based on the tile stream mapping information, mapping, by the renderer device, the decoded video frame onto one or more surfaces of the two-dimensional or three-dimensional model so that the first tile frame is mapped onto the first position on a surface of the model and the second tile frame is mapped onto the second position on a surface of the model.

11. The method according to claim 10, wherein
the renderer device is configured to receive a decoded video frame and perform a predetermined mapping comprising mapping respective samples at respective positions in the received decoded video frame to respective predetermined positions on one or more surfaces of the two-dimensional or three-dimensional model, the predetermined mapping comprising a step of;
mapping samples at the first position in the received decoded video frame onto said first position on a surface of the model; the method comprising steps of;
decoding, by the decoder device, the encoded video frame and outputting an intermediate decoded video frame, the intermediate decoded video frame comprising the first tile frame at a position that is different from the first position,
determining said decoded video frame based on the intermediate decoded video frame, the tile frame arrangement information and the predetermined mapping, such that the decoded video frame comprises the first tile frame at the first position, and
in accordance with the predetermined mapping, mapping, by the renderer device, the decoded video frame, herewith mapping the first tile frame onto said first position on a surface of the model.

12. The method according to claim 10, wherein
the immersive video comprises a third tile stream, different from the first and second tile stream,
the mapping information indicates for the third tile stream a third position on a surface of the two-dimensional or three-dimensional model, the method comprising steps of;
based on said tile stream mapping information and on a further viewport, determining a further plurality of tile streams including the first and third tile stream, and requesting encoded further video data from a server, the encoded further video data comprising, for each determined tile stream, an encoded further tile frame that comprises encoded further data representative of a further tile frame comprised in the tile stream, the encoded further video data comprising, for the third tile stream, an encoded further third tile frame that comprises encoded further data representative of a further third tile frame comprised in the third tile stream;
receiving, by the tile frame retrieval device, the encoded further tile frames and forming an encoded further video frame comprising the received encoded further tile frames including the encoded further third tile frame, each encoded further tile frame having a position in the encoded further video frame, and the tile frame retrieval device generating further tile frame arrangement information indicating the position of each encoded further tile frame in the encoded further video frame;
decoding, by the decider device, the encoded further video frame to obtain a decoded further video frame comprising the further tile frames at respective positions within the decoded further video frame;
based on the further tile frame arrangement information and based on the tile stream mapping information, mapping, by the renderer device, the decoded further video frame onto one or more surfaces of the two-dimensional or three-dimensional model so that each further tile frame is mapped onto the position as indicated by the mapping information for the tile stream that comprises the further tile frame herewith mapping the further third tile frame onto the third position on a surface of the model;
based on the mapped decoded further video frame, rendering, by the renderer device, at least part of the decoded further video frame on the display of the client device.

13. The method according to claim 12, wherein
the encoded further video frame comprises the encoded further third tile frame at said second position within the encoded further video frame, and
the decoded further video frame comprises the decoded further third tile frame at said second position within the decoded further video frame, and
the rendering device is configured to receive a decoded video frame and perform a decoded video frame specific mapping comprising mapping samples at positions within the received decoded video frame to respective positions on one or more surfaces of the two-dimensional or three-dimensional model in dependence on the tile frame arrangement information and the tile stream mapping information, the method comprising steps of;
decoding, by the decoder device, the encoded video frame and outputting the decoded video frame,
based on the tile stream mapping information and based on the tile frame arrangement information, performing, by the renderer device, a first mapping comprising mapping the decoded video frame onto a surface of the two-dimensional or three-dimensional model so that the second tile frame is mapped onto the second position on a surface of the model, decoding, by the decoder device, further encoded video frame and outputting the decoded further video frame, and based on the tile stream mapping information and further tile frame arrangement information, performing, by the renderer device, a second mapping comprising mapping the decoded further video frame onto a surface of the model so that the further third tile frame is mapped onto the third position on a surface of the model.

14. The method according to claim 1, wherein the immersive video comprises high quality tile streams that each comprise high resolution tile frames and low quality tile streams that each comprise low resolution tile frames, the model comprises one or more surfaces for the high resolution tile frames and one or more surfaces for the low resolution tile frames and a viewpoint, the determined plurality of tile streams comprises at least one high quality tile stream and at least one low quality tile stream, wherein the method comprises steps of;

receiving, for the high quality tile stream, an encoded high resolution tile frame that comprises data representative of a high resolution tile frame comprised in the high quality tile stream, receiving, for the low quality tile stream, an encoded low resolution tile frame that comprises data representative of a low resolution tile frame comprised in the low quality tile stream, and based on the tile stream mapping information and the tile frame arrangement information, mapping the decoded video frame onto one or more surfaces of the model, so that the high resolution tile frame is mapped onto the one or more surfaces for the high resolution tile frames and the low resolution tile frame mapped onto the one or more surfaces for the low resolution tiles.

15. The method according to claim 14, wherein the one or more surfaces for the high resolution tile frames are in front of the one or more surfaces for the low resolution tile frames as viewed from the viewpoint. steps performed by the tile retrieval device as defined in claim 1.

16. A client device for rendering a spatial part of an immersive video on a display comprising a tile frame retrieval device, a decoder device and a renderer device, wherein the immersive video comprises video frames, each video frame being spatially divided in tile frames, and the immersive video comprises tile streams, each tile stream representing a spatial part of the immersive video and each tile stream comprising a plurality of said tile frames, the client comprises a storage for storing tile stream mapping information, that indicates for each tile stream a respective position on a surface of a two-dimensional or three-dimensional model, the tile retrieval device is configured to, based on said tile stream mapping information and a viewport, determine a plurality of tile streams, and to request encoded video data from a server, the encoded video data comprising, for each determined tile stream, an encoded tile frame that comprises encoded data representative of a tile frame comprised in the tile stream, the tile frame retrieval device is configured to receive the encoded tile frames and to form an encoded video frame comprising the received encoded tile frames, each encoded tile frame having a position in the encoded video frame, to generate tile frame arrangement information indicating the position of each encoded tile frame within the encoded video frame, the decoder device is configured to decode the encoded video frame to obtain a decoded video frame comprising the tile frames at respective positions within the decoded video frame;

the renderer device is configured to, based on the tile frame arrangement information and based on the tile stream mapping information, map the decoded video frame onto one or more surfaces of the two-dimensional or three-dimensional model so that each tile frame is mapped onto the position of the one or more surfaces of the model, and the renderer device is configured to, based on the mapped decoded video frame, render at least part of the decoded video frame on the display of the client device.

* * * * *